United States Patent [19]

Yoshida et al.

[11] Patent Number: 5,192,961
[45] Date of Patent: Mar. 9, 1993

[54] REFLECTING ILLUMINATION TYPE PROJECTING DEVICE

[75] Inventors: Kazushi Yoshida; Ryota Ogawa; Tetsuya Abe, all of Tokyo, Japan

[73] Assignee: Asahi Kogaku Kogyo Kabushiki Kaisha, Tokyo, Japan

[21] Appl. No.: 691,673

[22] Filed: Apr. 25, 1991

Related U.S. Application Data

[63] Continuation of Ser. No. 383,079, Jul. 21, 1989, abandoned.

[30] Foreign Application Priority Data

| Jul. 22, 1988 | [JP] | Japan | 63-183099 |
| Jan. 13, 1989 | [JP] | Japan | 1-6786 |
| May 26, 1989 | [JP] | Japan | 1-133260 |
| Jun. 19, 1989 | [JP] | Japan | 1-157578 |

[51] Int. Cl.⁵ .................. G03B 21/28; G03B 21/08
[52] U.S. Cl. ........................................ 353/66; 353/67; 353/DIG. 4
[58] Field of Search ............ 353/63, 64, 65, 66, 353/67, 77, 78, 82, 122, DIG. 4

[56] References Cited

U.S. PATENT DOCUMENTS

| 3,064,523 | 11/1962 | Meltzer | 353/66 |
| 3,331,688 | 7/1967 | Altman | 353/66 |
| 3,479,512 | 11/1969 | Weissenberg | 353/66 |
| 3,486,817 | 12/1969 | Hubner | 353/66 |
| 3,525,566 | 8/1970 | Altman | 353/DIG. 4 |
| 3,946,222 | 3/1976 | Swanberg | 353/101 |
| 4,081,807 | 3/1978 | Urano et al. | 354/152 |
| 4,609,268 | 9/1986 | Crawford | 353/97 |
| 4,735,500 | 4/1988 | Grunwald | 353/DIG. 4 |
| 4,824,210 | 4/1989 | Shimazaki | 353/122 |

Primary Examiner—William A. Cuchlinski, Jr.
Assistant Examiner—William C. Dowling
Attorney, Agent, or Firm—Sandler, Greenblum & Bernstein

[57] ABSTRACT

A reflecting illumination type projecting device includes a projecting lens having an optical axis intersecting an object to be tested, a light source portion for illuminating the object through the projecting lens, a screen onto which an image of the object is projected by light reflected on the object through the projecting lens, and an optical path separating element disposed in the vicinity of an exit pupil, the element being formed with a total reflecting mirror portion for reflecting either the illuminating light or the reflected light and with a transmitting portion for transmitting the remaining light, thereby to make the illuminating light incident to the projecting lens and to guide the reflected light toward the screen.

74 Claims, 19 Drawing Sheets

REFLECTING ILLUMINATION TYPE PROJECTING DEVICE

This application is a continuation of application Ser. No. 07/383,079, filed Jul. 21, 1989, now abandoned.

BACKGROUND OF THE INVENTION

1. Field of the Invention

This invention relates to a projecting device used for observing a pattern, such as, for example, a film mask, printed board, or the like, and more particularly to a projecting device of a reflecting illumination type able to cope with an opaque object to be tested.

2. Description of the Prior Art

As a projecting device for the use of observation, there have heretofore been a transmission type in which an image formed by a light flux transmitted through an object to be tested, and a reflection type in which an image formed by a light flux reflected on an object to be tested is observed.

Although the transmission type is effective with respect to a transparent object to be tested such as film mask or the like, it cannot be used for an opaque printed board, etc.

Therefore, for the use of this type, there has been used a reflecting illumination type projecting device as conceptionally shown in FIG. 20.

The illustrated device comprises an illuminating optical system 10 including a light source 11 and a condenser lens 12, a projecting optical system 20 including a projecting lens 21, a screen 22 and relay mirrors 23, 24, a half mirror 30 disposed at angles with respect to an optical axis $Ax_2$ of the projecting lens 21, and a stage 40 on which an object to be tested, such as a printed board, etc., is placed.

An optical axis $Ax_1$ of the illuminating optical system 10 and the optical axis $Ax_2$ of the projecting lens 21 are intersected with each other, and the half mirror 30 is situated on the intersecting point.

The screen 22 is symmetrical with respect to the optical axis $Ax_2$.

A part of light flux emitted from the light source 11 is reflected by the half mirror 30 toward the object 41 and illuminates the object 41 through the projecting lens 21. The light flux reflected by the object 41 transmits through the projecting lens again and then transmits through the half mirror 30 to form an image of the object 41 on the screen 22.

In the case that the half mirror 30 is used as mentioned above, however, a quantity of light to form the image on the screen 22 is only 25% maximum of a quantity of light emitted from the light source 11 even on the assumption that the object 41 has a reflectance of 100%. In other words, loss in quantity of light is significant.

Furthermore, as the screen 22 of the conventional device is symmetrical with respect to the optical axis $Ax_2$, it is susceptible to ghost when reflection is occurred on a lens surface of the projecting lens 21.

The ghost has two types; one is of the type that is condensed onto the screen and the other is of the type that is diverged, depending on curvature of a lens surface. The latter hardly affects the observation. Also, there is a great difference in degree of affection depending on degree of convergence. When ghost is occurred, contrast of an image of the object is degraded on the screen, and some parts of the image become difficult to observe.

In order to explain these ghosts, details of the projecting lens 21 will be described by way of two examples.

The projecting lens 21 shown in FIG. 21 is a telecentric lens toward the object, which is of six-piece structure. The projecting lens 21 has first to sixth lenses $21a \sim 21f$ which are arranged in this order from the side of the half mirror 30.

According to this constitution of a lens, when a reflection is occurred on a surface at the mirror side of the fifth lens 21e, the ghost all returns to inside the screen as shown in FIG. 22. Moreover, in this case, as the ghost is hardly diverged in an optical path unto the screen 22, affection of the ghost appeared on the screen is significant. Particularly, this disturbs observation of the image of the object.

In the case that reflection is occurred on a surface at the object side of the sixth lens 21f, the ghost reaches the screen 22 in the manner as shown in 23 and disturbs observation. In this case, however, divergence of the ghost is greater than that of the case shown in FIG. 22, and as it is only a part of the ghost which reaches the screen, adverse affection to observation is less than that in the case of FIG. 22.

FIG. 24 shows another example of the prior art, in which a projecting lens 21' nontelecentric toward the object 41 is employed. This projecting lens 21' comprises first to fourth lenses $21g \sim 21j$. The relation of arrangement of the remaining component parts such as the half mirror 30, the screen 22, etc. is the same as that shown in FIG. 21.

In the projecting lens of FIG. 24, in the case that reflection in occurred on an object side surface of the third lens 21i, the ghost appears in a peripheral portion of the screen 22 as shown in FIG. 25. Similarly, in the case that reflection is occurred on an object side surface of the fourth lens 21j, the ghost appears in the central portion of the screen as shown in FIG. 26.

There have been several measures for reducing the ghost. One of the conventional measures employs an reflection reducing coating on a lens surface. In another measure, a lens is carefully designed at one stage of designing the lens so that ghost would not be conspicuous. However, none of these measures could fundamentally solve the problems.

In the above-mentioned two examples of the prior art, the same projecting lens to that of the present invention as will be described is employed in order to facilitate the comparison of the affection of ghost.

SUMMARY OF THE INVENTION

The present invention has been accomplished in view of the above-mentioned problems. It is therefore a first object of the invention to reduce the loss of a light quantity while employing the reflecting illumination type. A second object of the invention is to cut at least ghost which significantly disturbs observation.

A first feature of a reflecting illumination type projecting device according to the present invention comprises a projecting lens having an optical axis intersecting an object to be tested; a light source portion for emitting an illuminating light and illuminating the object through the projecting lens; a screen onto which an image of the object is projected by light reflection on the object through the projecting lens, and an optical path separating element disposed in the vicinity of a pupil at an outgoing side of the projecting lens for projecting a ray of light of an image of the object; said element being formed with a total reflecting mirror portion for reflecting either the illuminating light or the reflected light and with a transmitting portion for transmitting the remaining light, thereby to made the illuminating light incident to the projecting lens and to guide the reflected light toward the screen.

Similarly, a second feature of a reflecting illumination type projecting device according to the present invention is that the screen is disposed eccentric toward the side where a light flux coming from the light source portion is made incident to the projecting lens with respect to an optical axis of the projecting lens.

BRIEF DESCRIPTION OF THE DRAWINGS

FIG. 1 is an explanatory view showing an outline of the constitution,

FIG. 2 is a view showing an optical path of the device of FIG. 1,

FIG. 3 is an development of FIG. 2 for explaining the relation between the dimension of a light source and the illuminance on a screen, FIG. 4 is a graph showing the relation between the ratio of a focal length of a condenser lens system and the illuminance on an object to be tested, and FIG. 5 is an explanatory view for showing an angle of convergence of an illuminating light and a reflection occurred at a missing portion of the object.

FIG. 6 is a view of an optical path showing one example where a light source is shifted from an optical path of a condenser lens, FIG. 7 is likewise a view or an optical path showing another example where light reflected on an object to be tested is reflected by a half-size mirror, FIG. 8 is a view of an optical path showing a further example where a roof mirror is employed as an optical path separating element, FIG. 9 is a plan view of a ring mirror, FIG. 10 is a plan view of a central portion small mirror, and FIG. 11 is an explanatory view of a mirror for forming a ring light flux.

FIG. 12 is an explanatory view for showing a light flux coming from an object to be tested, and FIGS. 13 and 14 are explanatory views for showing one state of ghost.

FIG. 15 is an explanatory view for showing a light flux coming from a object to be tested, and FIGS. 16 through 17 are explanatory views for showing another state of ghost.

FIG. 21 is an explanatory view for showing a light flux coming from a object to be tested, and FIGS. 22 and 23 are explanatory views for showing a further state of ghost.

FIG. 24 is an explanatory view for showing a light flux coming from an object to be tested, and FIGS. 25 and 26 are explanatory views for showing a still further state of ghost.

DETAIL DESCRIPTION OF THE EMBODIMENTS

A reflecting illumination type projecting device according to the present invention will now be described with reference to the accompanying drawings.

EXAMPLE 1

FIGS. 1 through 8 show a first embodiment of the present invention.

Figure 1:
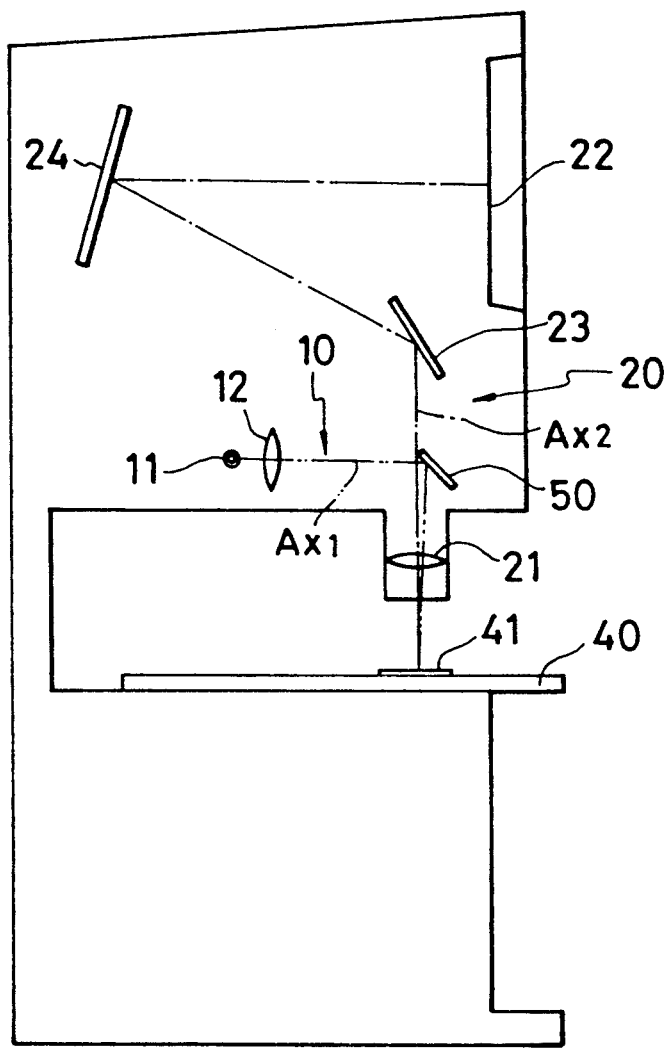
FIGS. 1 through 5 show a first embodiment of a reflecting illumination type projecting device according to the present invention.

This reflecting illumination type projecting device, as schematically shown in FIG. 1, comprises a light source portion 10 including a xenon lamp 11 as a light source and a condenser lens 12, a stage 40 on which an object-to-be-tested (hereinafter simply referred to as the "object") 41 is placed, a projecting lens 21 having an optical axis $Ax_2$ that is generally vertical to the stage 40, a screen 22 onto which an image of the object 41 is projected by a reflected light coming from the object 41 that is transmitted through the projecting lens 21 and reflected by, relay mirrors 23, 24 and half-size mirror 50 that has an optical path separating element disposed at a position of an exit pupil of the projecting lens 21.

The projecting lens 21 is disposed towards a side of the half-size mirror 50, optical axis $Ax_2$ of the projecting lens 21 being vertical to optical axis $Ax_1$ of the light source portion 10. However the actual construction of both axes is not critical to this invention.

The half-size mirror 50 is disposed at one side of the optical path with reference to the diameter of the projecting lens 21 and opposite the xenon lamp 11, in order to reflect an illuminating light coming from the light source portion 10 towards the projecting lens 41.

Similarly, the half-size mirror 50 is established in position at an exit pupil of the projecting lens 21. Accordingly, light reflected by the object 41 transmits through the opposite side of the half-size mirror 50 towards the screen 22 with reference to the optical axis $Ax_2$ of the projecting lens 21.

Figure 2:
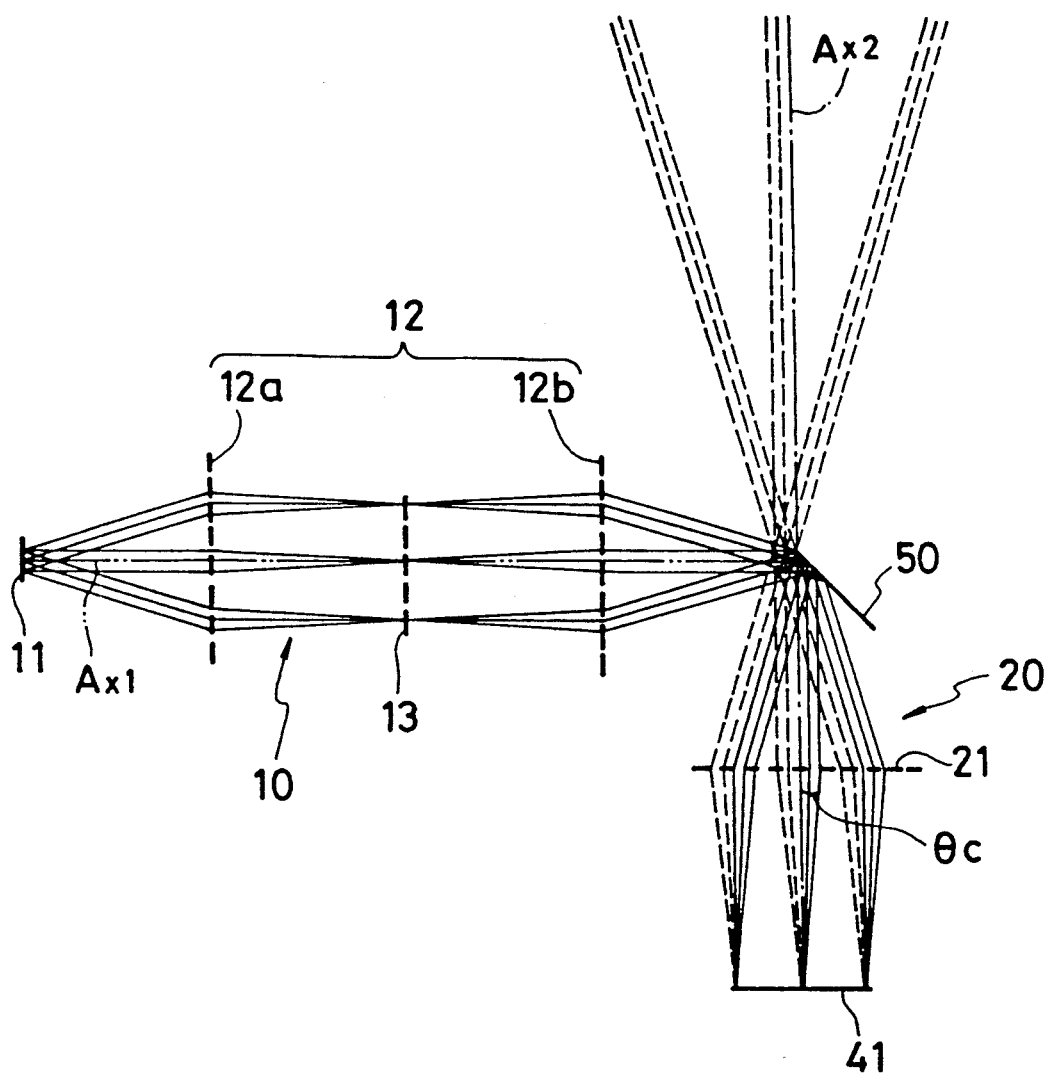

On the other hand, the condenser lens 12 of the light source portion 10, as shown in FIG. 2, comprises two pieces of front and back lenses 12a and 12b, and a field stop 13 is disposed between the lenses 12a and 12b. These lenses are arranged as such that the xenon lamp 11 and the half-size mirror 50 are conjugate with each other. Owing to the relation of arrangement of the half-size mirror 50 and the light source portion 10, a secondary light source image is formed on the half-size mirror 50. In other words, a light flux emitted from the light source portion 10 is all condense onto the half-size mirror 50 and then deflected toward the stage 40.

The field stop 13 and the stage surface are conjugate with each other through the condenser lens 12b and the projecting lens 21, whereas the stage 40 and the screen 22 are generally conjugate with each other through the projecting lens 21.

This relation can be understood with reference to FIG. 2 which explains the optical path of the device of the above-mentioned constitution. The figure represents three rays of light each emitted from three points of the xenon lamp 11.

The rays of light from the xenon lamp 11 to the stage 40 are shown by solid lines and rays of light regularly reflected by the object 41 are shown by broken lines. The optical axis $Ax_1$ of the light source portion 10 is shown by two-dotted chain lines and the optical axis $Ax_2$ of the projecting lens 21 is shown by one-dotted chain lines.

According to the constitution as mentioned above, a light flux emitted by the light source portion 10 is all reflected toward the object 41 by the half-size mirror 50. Moreover, components of the regular reflection of the light flux reaching the object 41 through the projecting lens 21 transmit through the projecting lens 21 again and are guided toward the screen 22, and then form an image of the object 41 on the screen 22 at a high contrast.

Accordingly, loss of the light quantity on the object 41 becomes zero with respect to the components of the regular reflection and therefore, effective utilization of light quantity can be attained. In the experiments carried out by the inventors, illuminance on the screen was found to be improved about twice compared with the conventional device in which a half mirror is employed. In the experiments, the remaining conditions were the same.

By the way, the above-mentioned device employs a xenon lamp as a light source, in which the dimension of the light portion is about 2 mm. Owing to the foregoing, when compared with a device which employs a light source of a large light emitting portion, the screen is brighter with the same light quantity. Also, in the case that the object has a defective portion, contrast between the defective portion and the normal portion observed on the screen is high. Furthermore, as a spectrum distribution of the xenon lamp is large at a visible radiation, it is advantageous for the above-mentioned device in which observation is preformed through naked eye. A halogen lamp generally used as an illuminating light source has a light emitting portion of about 10 mm. Moreover, the ratio occupied by infrared components is large.

The relation between the dimension of the light emitting portion and the illuminance of the screen will be described first.

Figure 3:
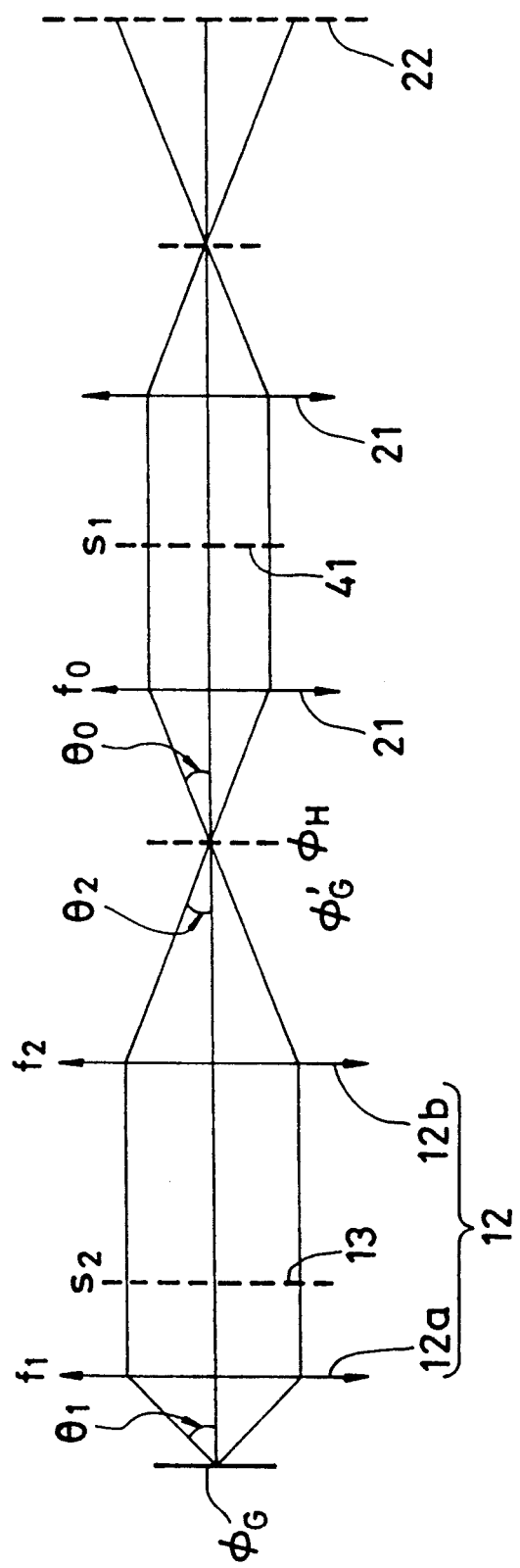

As shown in FIG. 3, let the dimension of the light source be represented by $\phi_G$, the taking angle of the illuminating light from the light source, by $\theta_1$, the focal lengths of the condenser lenses, by $f_1$, $f_2$, respectively, the effective diameter of the field spot, by $S_2$, the diameter of the exit pupil of the projecting lens, by $\phi_H$, the dimension of the secondary light source image formed in position of this exit pupil, by $\phi_G'$, the angle of incidence of a ray of light into the exit pupil of the projecting lens 21, by $\theta_2$, and the angle of incidence of a ray of light required for illuminating the whole area of the effective diameter $(S_1)$ of the object by the telecentric projecting lens of the focal length $f_0$, by $\theta_0$. $S_1$ and $\theta_0$ are handle as constant here.

In order to uniformly illuminate the whole are of the effective diameter of the object, it is necessary to satisfy the condition of $\theta_2 \geq \theta_0$. However, if $\theta_2$ becomes excessively large, a light flux which is not required for illuminating the object is increased, and such increased unnecessary light flux becomes the cause for generating the flare, etc. Therefore, it is preferable to satisfy the relation of $\theta_2 = \theta_0$ by letting $S_2 = (f_2/f_0) \cdot S_i$.

In the case that the relation of $\theta_2 = \theta_0$ is satisfied and the secondary light source image is formed on the exit pupil, it is required to satisfy the condition of $\phi_G' \leq \phi_H$ in order to make the loss of light quantity zero. And, in the case that this condition is satisfied, the illuminance L on the object is expressed by the following relation presuming that the luminous intensity distribution characteristics of the light source are uniform.

$$L = k \cdot (1 - \cos \theta_1) \quad [k: \text{proportional constant}]$$

In the case that the secondary light source image is larger than the exit pupil ($\phi_G' > \phi_H$), the illuminance L is expressed by the following relation.

$$L = k \cdot (1 - \cos \theta_1) \cdot (f_1/f_2) \cdot (\phi_H/\phi_G))^2 \quad [k: \text{proportional constant}]$$

Therefore, if it is within a degree of 90, the larger the taking angle $\theta_1$ is, the more improvement of illuminance of the object can be obtained.

This $\theta_1$ can be expressed by the following relation.

$$\tan \theta_1 = (f_2/f_1) \cdot \tan \theta_2$$

In the case that a relation of $\theta_2 = \theta_0$ is satisfied, it can be expressed as follows.

$$\tan \theta_1 = (f_2/f_1) \cdot \tan \theta_0$$

As $\tan \theta_0$ is constant here, $\theta_1$ depends on $f_2/f_1$.

On the other hand, the dimension $\phi_G'$ of the secondary light source image can be expressed by the following relation.

$$\phi_G' = (f_2/f_1) \cdot \phi_G$$

However, the upper limit is fixed in order to satisfy the condition of $\phi_G' \leq \phi_H$.

Therefore, in order to make the value of $f_2/f_1$ larger within a limited range, the smaller the value of $\phi_G$ is, the more the illuminance on the object can be increased and thus the more the brightness of the image can be increased on the screen presuming that the light quantity of the light source to be used is equal.

Figure 4:
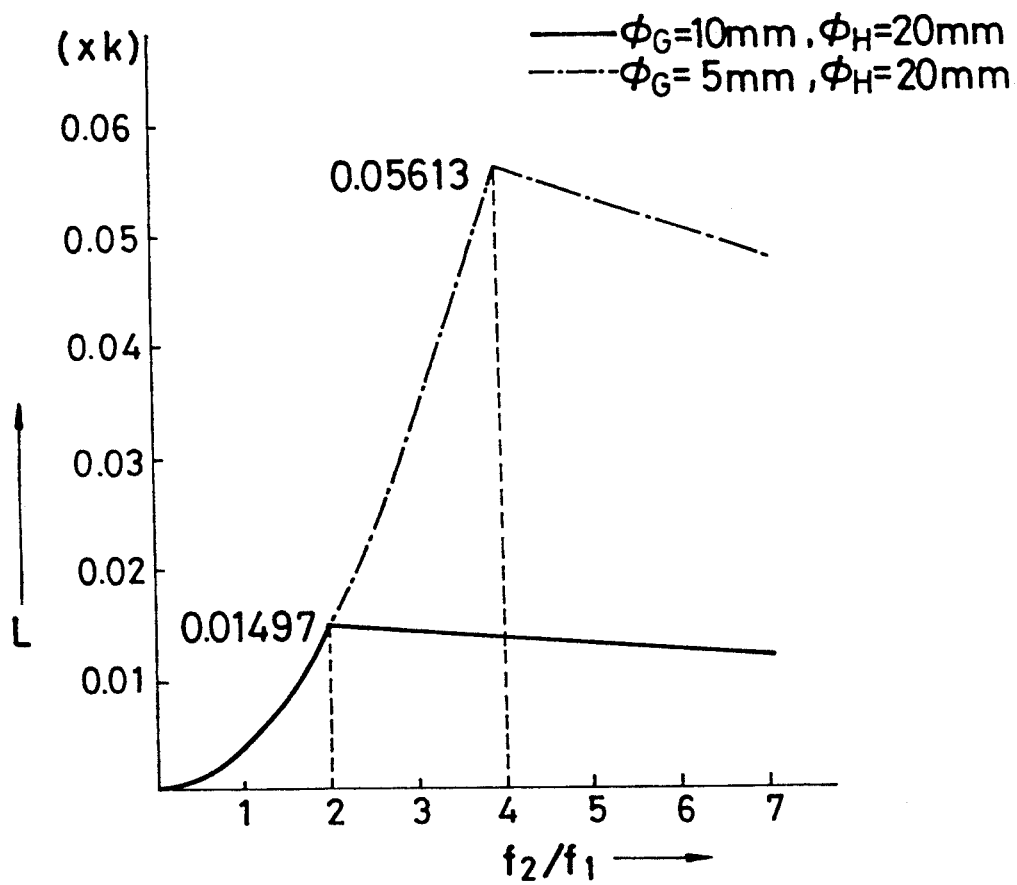

FIG. 4 is a graph showing the relation between $f_2/f_1$ and the illuminance L on the object under the condition of $\theta_0 = \theta_2 = 5°$ and $\phi_H = 20$ mm. The solid line shows one relation when $\phi_G = 10$ mm, and the one-dotted chain line shows another relation when $\phi_G = 5$ mm. When $\phi_G = 10$ mm, a relation of $\phi_G' = \phi_H$ is satisfied given that $f_2/f_1 = 2$. When $\phi_G = 5$ mm, a relation of $f_2/f_1 = 4$ is satisfied given that $\phi_G' = \phi_H$.

The relation between the contrast on the screen and the dimension of the light emitting portion will be described next.

Figure 5:
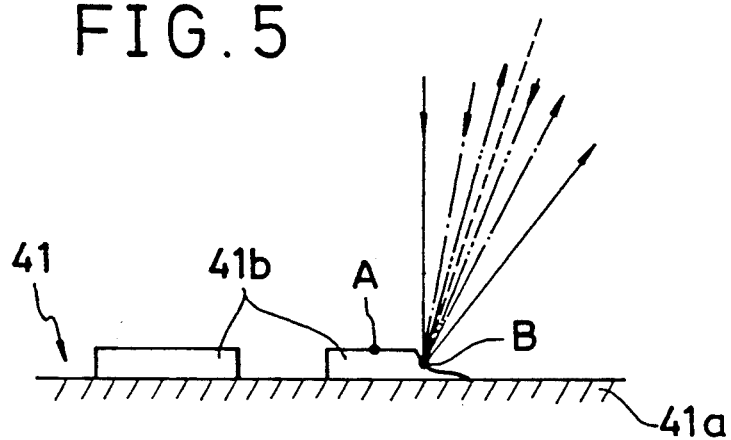

In the case that the object has a defect such as a scratch, etc., the smaller the converging angle $\phi_C$ is, the more easily the defect can be found. As is shown in FIG. 5, in the case that a part of a conducting pattern as an object to be tested is missing on the printed board, the missing portion forms an inclined surface. A ray of light (one-dotted chain line) of the illuminating light having a small angle with respect to a principle ray of light (solid line) is diverged without returning to the projecting lens when reflected by the inclined surface. On the contrary, a ray of light (two-dotted chain line) having a large angle with respect to the principal line sometimes returns to the projecting lens.

Therefore, if the converging angle of the illuminating light is smaller, the contrast between the defective portion and a normal portion becomes higher on the screen, and thus identification becomes easy.

If the block by the exit pupil can be disregarded, the converging angle $\theta_C$ of the illuminating light corresponds to the dimension $\phi_G'$ of the secondary light source image and therefore, depends on the dimension $\phi_G$ of the light source. The correlation thereof is expressed by the following relation.

$$\tan \theta_C = (\phi_G'/2) \cdot f_0 = (f_2/f_1) \cdot (\phi_G/2) \cdot f_0$$

Therefore, the smaller the secondary light source image is, the smaller the converging angle of the illuminating light can be obtained. Therefore, if the value of $f_2/f_1$ is constant, the smaller the light emitting portion of the light source is, the more the converging angle can be reduced and thus, the contrast can be intensified.

In the case that the dimension of the light source is comparatively small, the converging angle $\theta_C$ of the illuminating light becomes small. Therefore, the reflected light coming from the defective portion does not reach the screen and thus, the defective portion looks dark.

On the contrary, in the case that the dimension of the light source is comparatively large, the converging angle $\theta_C$ of the illuminating light becomes comparatively large. Therefore, a part of the reflected light from the defective portion reaches the screen and thus, the defective part also looks bright. In the case that the diameter of the exit pupil of the projecting lens necessarily becomes large. This eventually becomes a limitation to the design of a lens.

The function when the magnification of the projecting lens is varied will now be described.

The above-mentioned reflecting illumination type projecting device is designed as such that when the observation magnification is varied, the focal length and position of the projecting lens are changed without changing the object-image distance. Whatever magnification is selected, the secondary light source image is formed in such a manner as to be generally coincident with the position of the exit pupil of the projecting lens.

In the above-mentioned establishment, in the case that a plurality of telecentric projecting lenses are alternately used, the degree of angle of the light flux at the exit pupil with respect to the effective diameter of the object of each lens becomes generally the same. Given that the focal length of the projecting lens is $f_0$, the magnification is M, the effective diameter of the object is $S_1$, and the exit pupil of the projecting lens is $\phi_H$, by satisfying a relation of $S_2 = (f_2/f_0) \cdot S_1$ wherein the diameter of the field stop is $S_2$, there can be illuminated the whole area of the effective diameter of the object at a generally uniform brightness.

In the case that lenses each having a different focal length are employed, the dimension $\phi_G'$ of the secondary light source image by the light source portion is made smaller than the exit pupil diameter $\phi_H$ of each lens and the position of the secondary light source image is brought into generally coincidence with the position of the exit pupil. By virtue of the foregoing arrangement, the light flux coming from the illuminating system can be irradiated onto the object without losses (excluding losses due to transmittance of a lens) whatever lenses are employed.

In the case that the object is illuminated by an illuminating light coming from light sources having the same light quantity through projecting lenses each having a different focal length, the higher the magnification is, the smaller the irradiating area becomes, and the higher the illuminance on the object becomes. On the other hand, in the case that the image of the object is projected onto the screen, the higher the magnification is, it is required to more enlarge the scope of the irradiated object and then project the same.

Therefore, the higher the magnification is, the larger the reduction of the light quantity becomes. By means of offset of these members, the change in degree of brightness on the screen can be restrained on the screen. For example, the object-image distance IO is set as $IO = 1400$ mm, and the illuminance by a ten times ideal lens (aplanatic lens of a distance between both principal points $HH' = 0$) of a focal length $f_0 = 115.702$ mm is compared with that of a twenty times ideal lens of a focal length $f_0 = 63.492$ mm.

Given that the illuminances on the object corresponding to the ten times and twenty times lenses are represented by $L_1$, $L_2$, respectively and the illuminances on the screen are represented by $L_1'$, $L_2'$, respectively, the following relation can be obtained.

$$L_1:L_2 = 1:3.321, \quad L_1':L_2' = 1:0.830$$

Therefore, even in the case that magnification is raised by exchanging the lenses, the illuminance on the screen is hardly changed. The foregoing principle is effective not only when lenses are exchanged but also when magnification is varied utilizing a zoom lens.

If the constitution is such that even when magnification is varied, the irradiating area at the side of the object is not varied, the following relations can be obtained.

$$L_1:L_2 = 1:1, \quad L_1':L_2' = 1:0.25$$

Therefore, the illuminance on the screen is greatly reduced when magnification is raised by exchanging lenses. As a result, the higher the magnification is, the more the observation becomes difficult.

In the case that the irradiating area at the side of the object is varied, even if the secondary light source image becomes slightly larger than the exit pupil and block is occurred, the problem of lowering the illuminance on the screen is not so large. However, it is desirable that no block is occurred at the exit pupil. It is also preferable that the dimension of the secondary light source image and thus, the dimension of the light source is preferably small.

Modified embodiment of the preceding embodiment will be described next.

Figure 6:
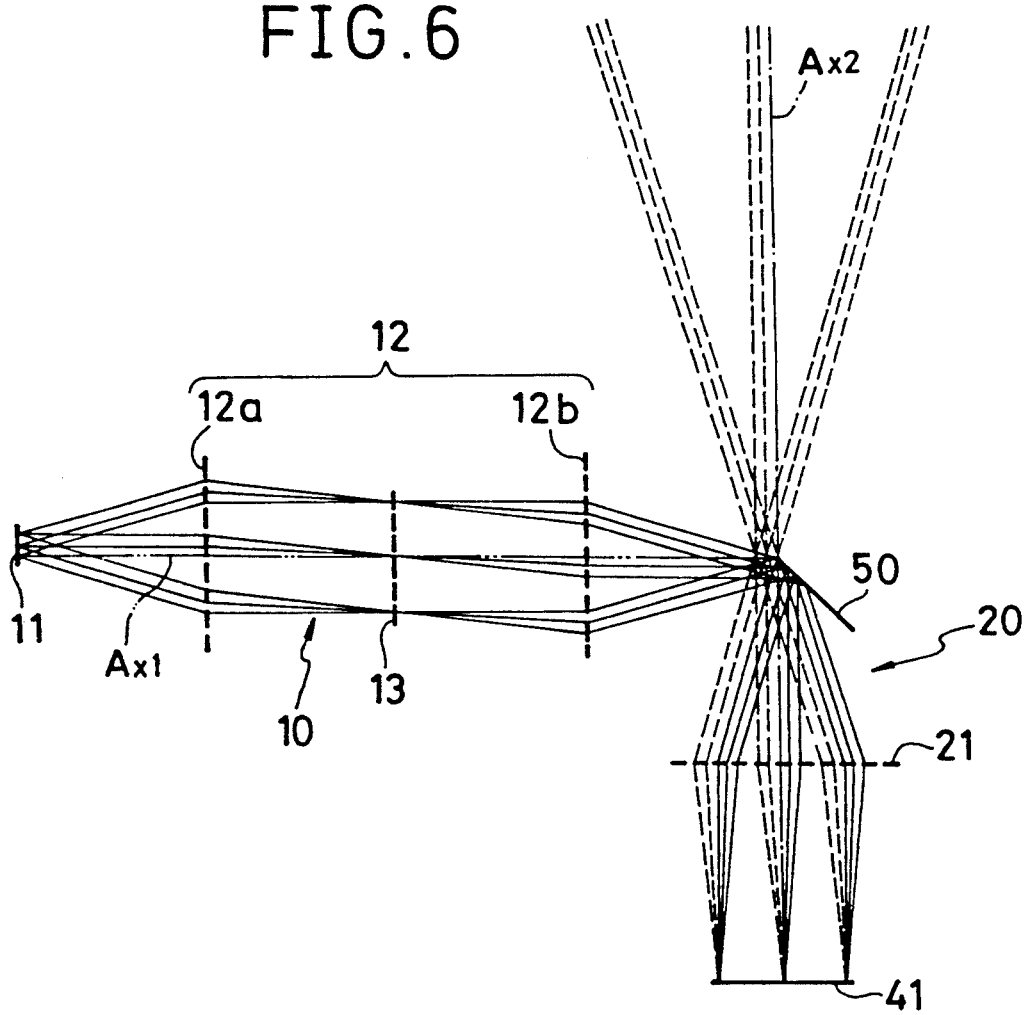
FIGS. 6 through 11 show modified embodiments of the first embodiment.

In the example of FIG. 6, a half-size mirror 50, as the same manner as in the example of FIG. 2, is disposed at one side with respect to an optical axis $Ax_2$ of a projecting lens 21 and opposite a xenon lamp 11. The mirror 50 covers a half of the optical path of the projecting lens 21 between the stage and the screen. In this example, however, the optical axis $Ax_1$ of a light source portion 10 passing through the center of the condenser lenses 12a and 12b and the optical axis $Ax_2$ of the projecting lens 21 intersect with each other on the half-size mirror 50, but the xenon lamp 11 is shifted upward in the figure than the optical axis $Ax_1$.

As a result, an image of the xenon lamp 11, as in the same manner as the preceding embodiment, is formed on the half-size mirror 50 and a light flux coming from the light source portion is all reflected by the half-size mirror 50 toward the stage 40.

Also, a light flux, which illuminates the object through the projection lens 21 and is regularly reflected by the object, again transmits through the side where the half-size mirror 50 is not disposed with reference to the optical axis through the projecting lens 21 and reaches to a screen (not shown).

The above-mentioned two embodiments are constituted as such that the light flux coming from the light source is reflected by the half-size mirror 50 and then guided to the object 41 through the projecting lens 21. The reflected light from the object 41 makes incident to the projecting lens 21, and then not reflected by the half-size mirror 50 but directly projected onto the screen 22.

However, the application of the present invention is not limited to the above-mentioned constitution. Instead, it may be constituted as shown in FIG. 7 or FIG. 8.

Figure 7:
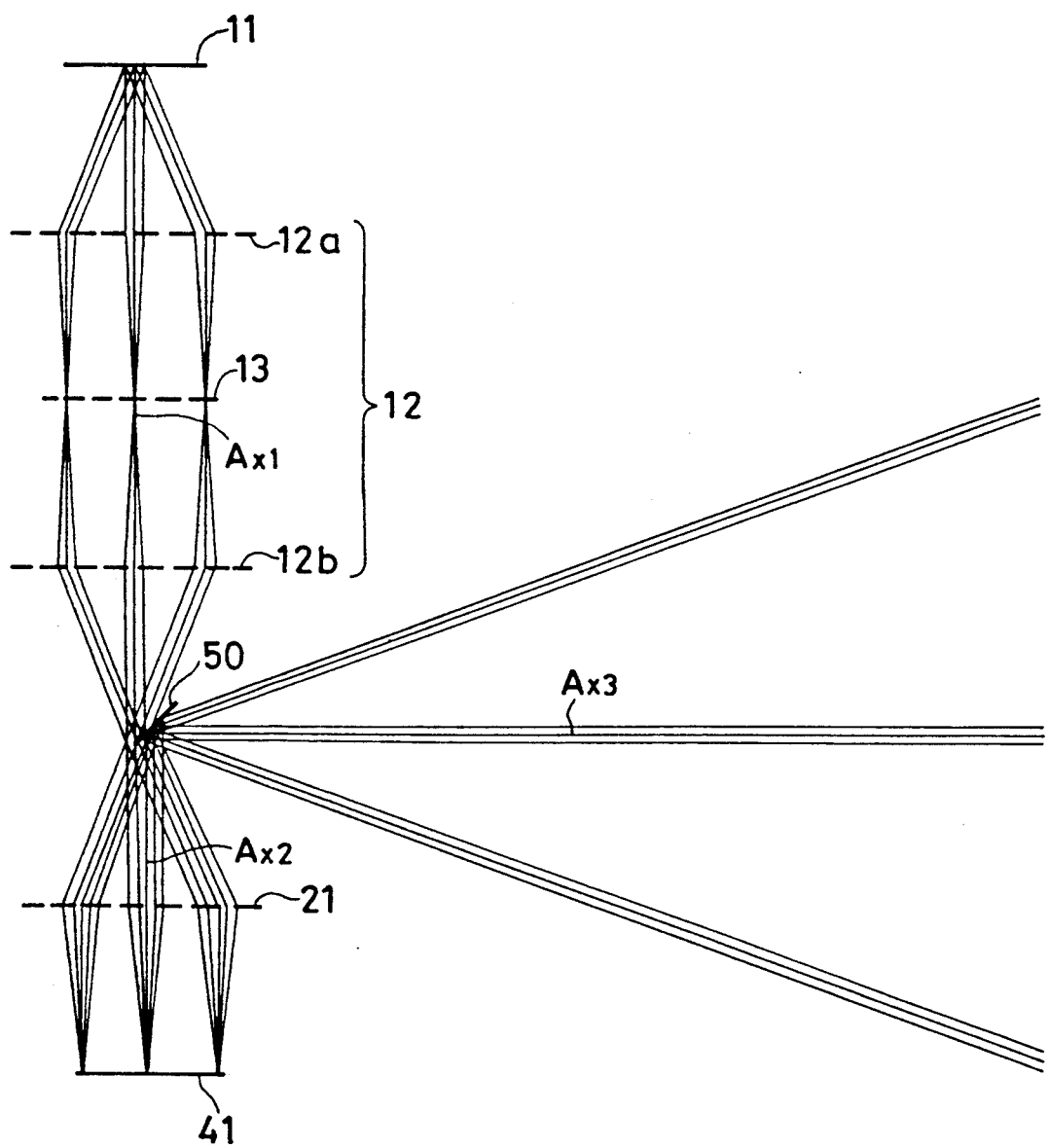

In the example of FIG. 7, contrary to the example of FIG. 2, the light flux coming from the light source is directly made incident to the projecting lens 21 and the reflected light from the object 41 is bent by a half-size mirror 50 and then guided to the screen 22.

Figure 8:
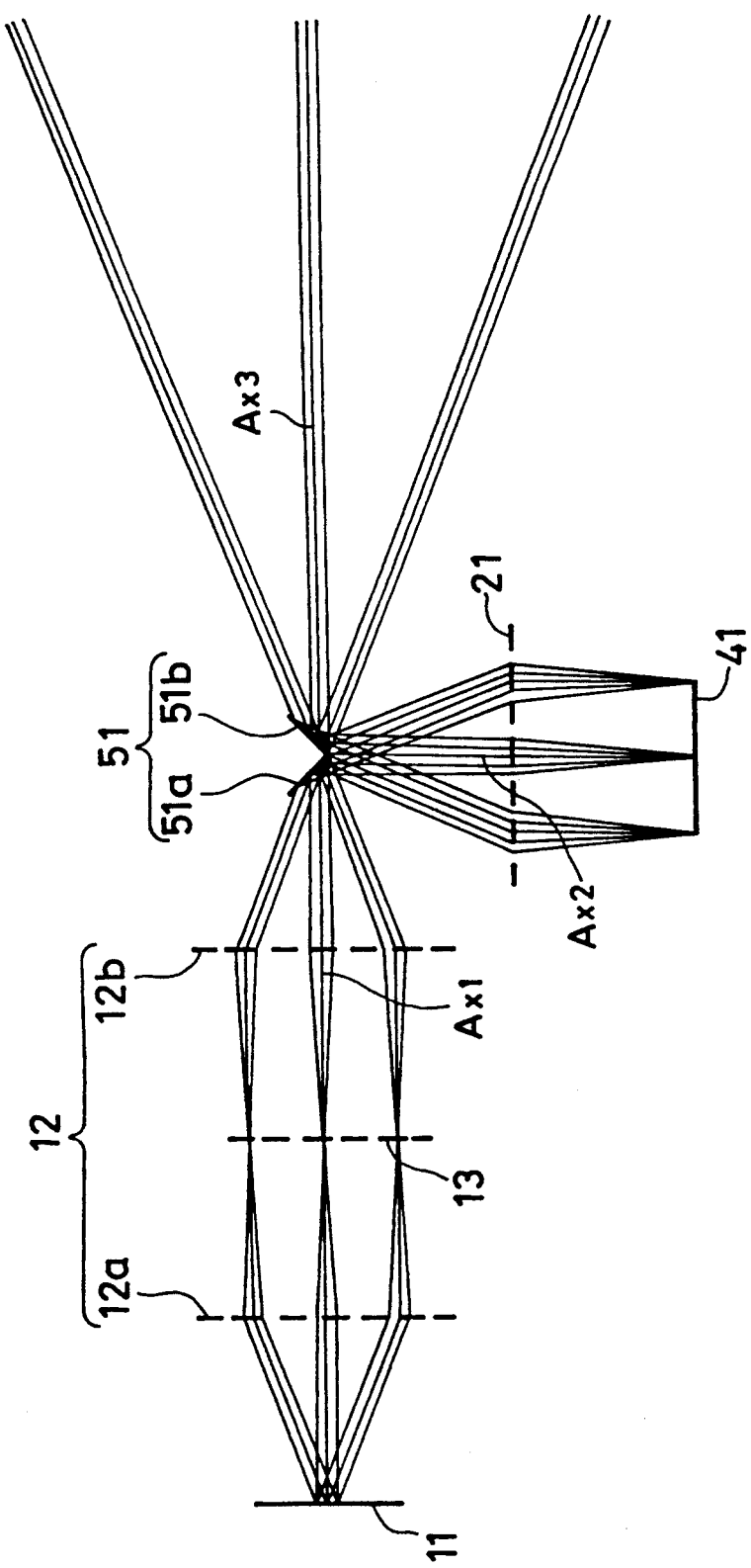

On the other hand, in the example of FIG. 8, a roof mirror 51 instead of the half-size mirror 50 is employed, and a light flux made incident to the projecting lens 21 from the side of the light source and the optical path reflected by the object 41 toward the screen are bent by a mirror.

The examples of FIG. 7 and 8 are the same as the example of FIG. 2 with respect to the arrangement relation when developed along the optical path, only excepting the arrangement of optical elements such as mirrors.

Furthermore, the constitution of the optical path separating element is not only the one in which, as in the above-mentioned embodiments, the light flux is bisected with reference to the diameter thereof, but also the following modifications can be contemplated.

Figure 9:
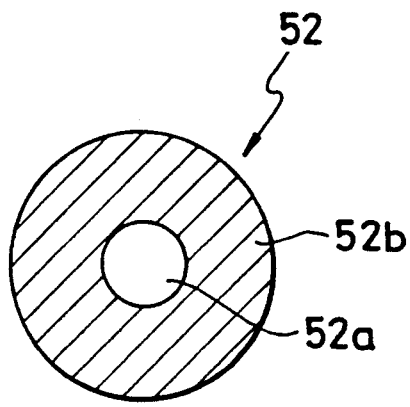

First, as shown in FIG. 9, there can be employed a ring mirror 52 including a transmitting portion 52a disposed at the center thereof and a ring-shaped total reflecting mirror portion 52b disposed at the periphery of the transmitting portion 52a.

Figure 10:
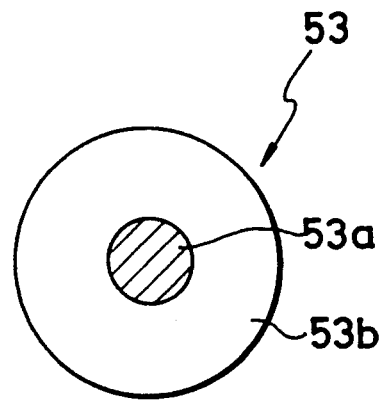

Second, as shown in FIG. 10, there can be employed a center small mirror 53 including a total reflecting mirror portion 53a disposed at the center thereof and a ring-shaped transmitting portion 53b disposed at the periphery of the total reflecting mirror portion 53a.

Figure 11:
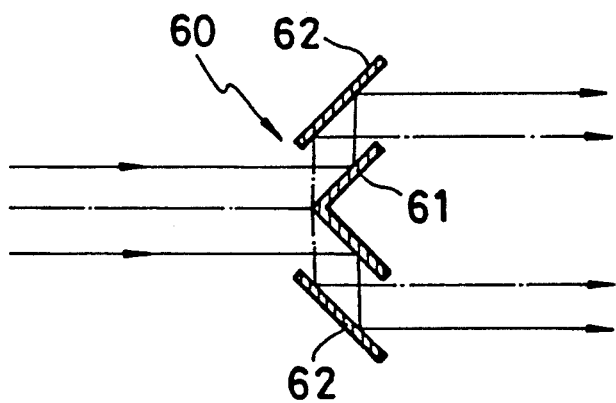

In the case that the ring mirror 52 is used, the same arrangement relation as that shown in FIG. 2 is employed and the mirror 52 is disposed in the optical path at angles with respect to the optical axis $AX_2$ of the projecting lens 21. And, the illuminating light is made into a ring light flux by a ring light flux forming means 60 as shown in FIG. 11 and the total light quantity thereof is reflected by the total reflecting mirror portion 52b toward the object. Also, the reflected light from the object 41 transmits through the transmitting portion 52a toward the side of the screen 22.

The ring light flux forming means 60 comprises a small-sized conical mirror 61 having an external surface served as a mirror surface, and a large-sized conical mirror 62 having an inner surface serving as a mirror surface.

On the other hand, in the case that the center small mirror 53 is used, the same arrangement relation as that shown in FIG. 2 is employed and the mirror 53 is disposed in the optical path at angles with respect to the optical axis $AX_2$ of the projecting lens 21. And, the illuminating light is condensed to the central total reflecting mirror portion 53a and reflected toward the object 41. The reflected light from the object 41 transmits through the peripheral transmitting portion 53b toward the side of the screen 22.

In the above-mentioned embodiments, there has been described only with respect to an example in which the projecting lens is placed between the optical path separating element and the object. However, the present invention is not limited to this. For example, it may be provided as an objecting lens and an imaging lens which are disposed at an upper position and at a lower position with the optical path separating element interposed therebetween.

Also, in the above-mentioned examples, the regularly reflecting component at the object is effectively guided to the screen. However, the present invention is not limited to this, either. For example, as the copper portion on the printed board has a powerful irregularly reflecting component, if diagonally illuminating means for illuminating from the diagonal direction outside the axis of the projecting lens is provided, various objects can be coped with either by switching with the light source portion or simultaneously.

As described in the foregoing, according to this embodiment, while adopting the constitution of the reflecting illumination type, loss of light quantity by the reflecting mirror portion can be restrained and the contrast of an image of the object formed on the screen can be improved.

EXAMPLE 2

Figure 12:
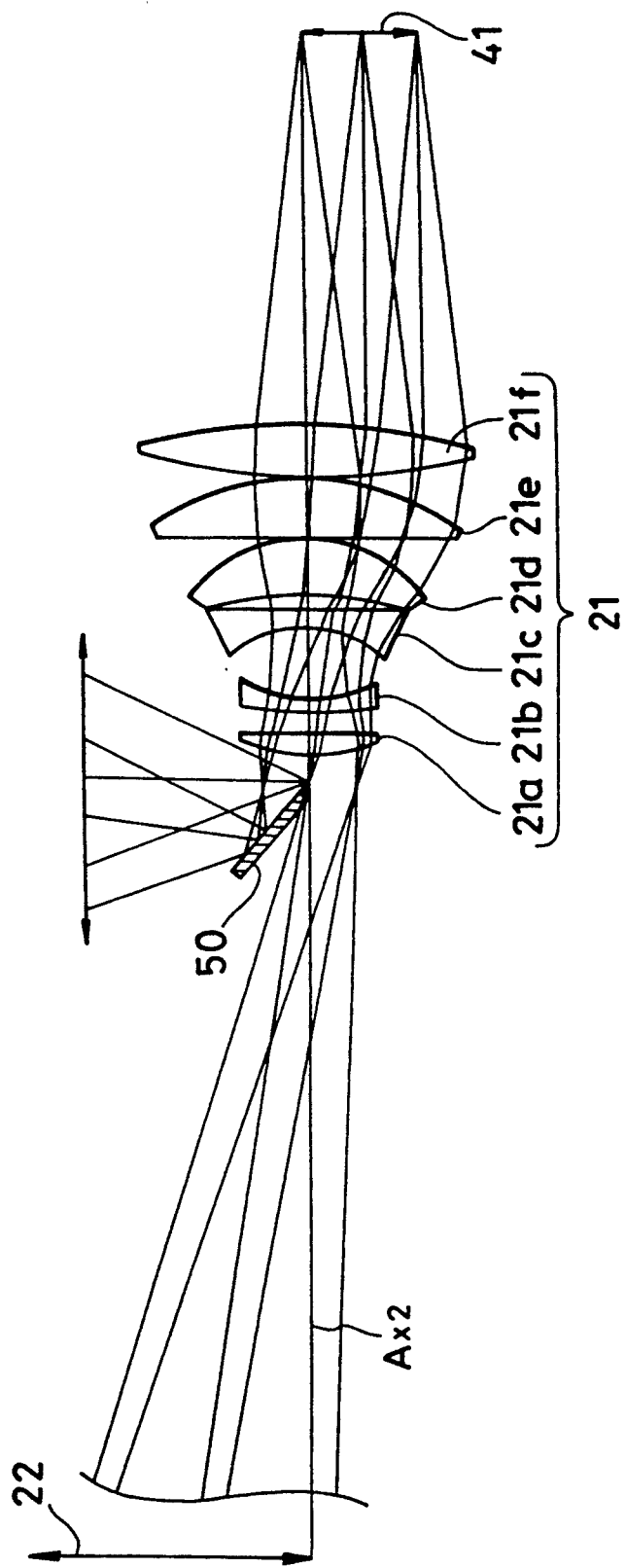
FIGS. 12 through 14 show a telecentric projecting lens according to a second embodiment of the present invention.
Figure 13:
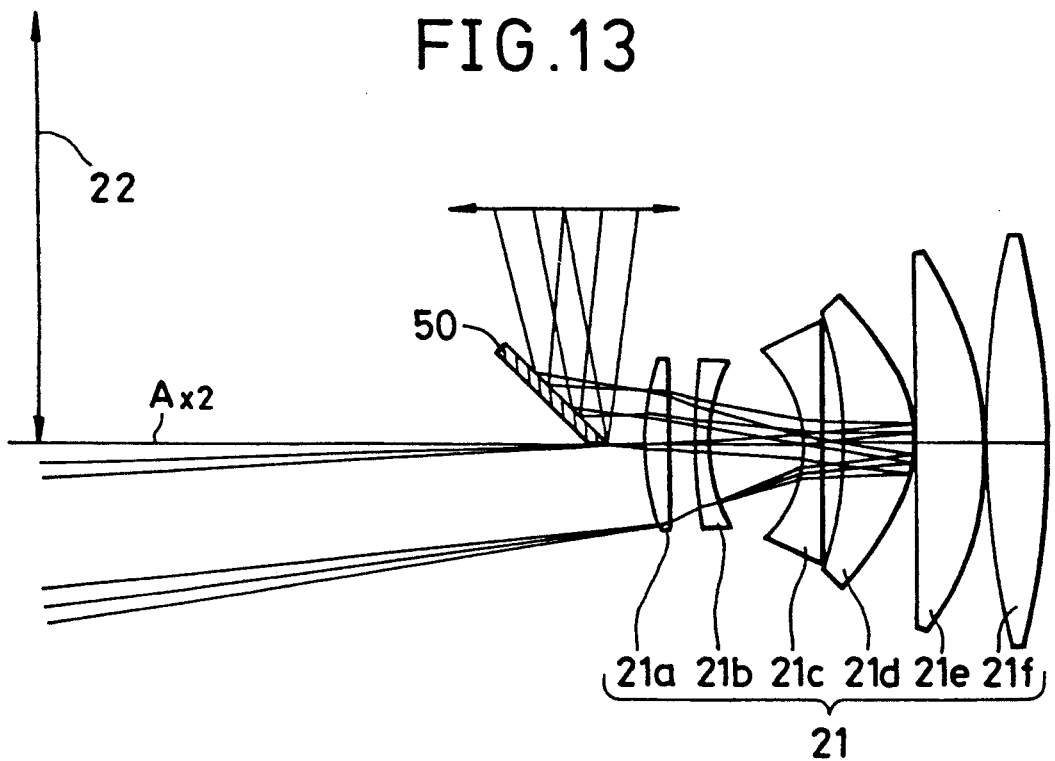
Figure 14:
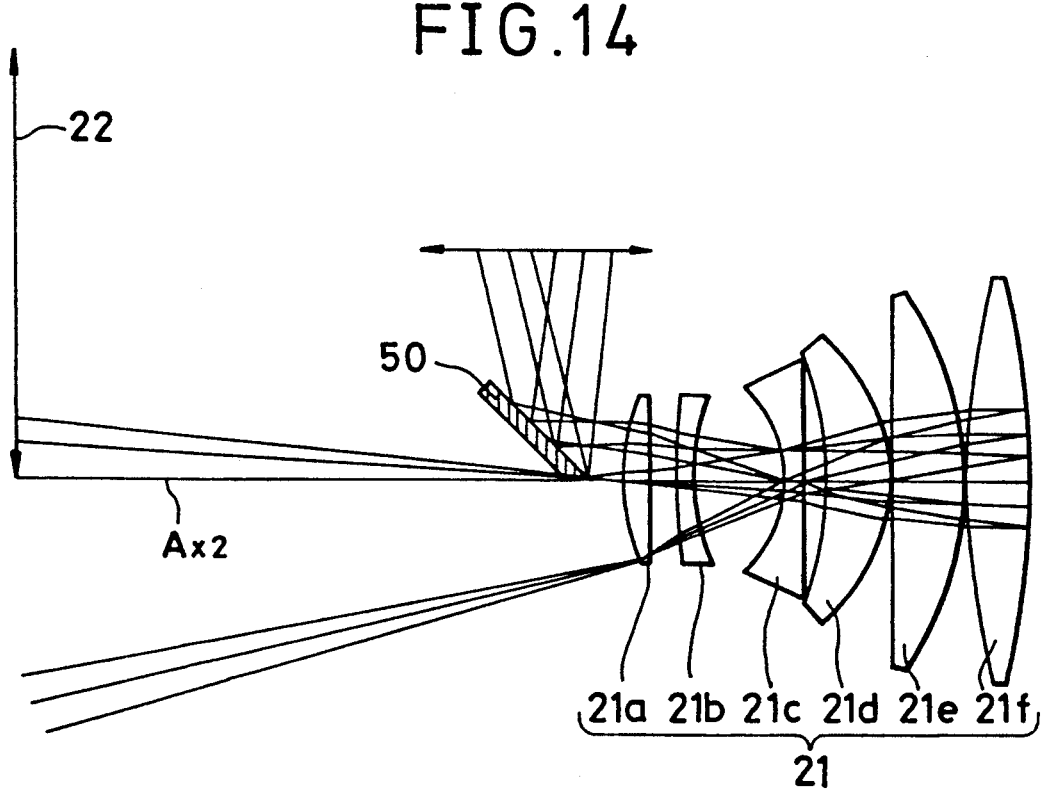

FIGS. 12 through 14 show a second embodiment of the present invention. In the following description, component parts same to or identical with those of the first embodiment will be represented by the same reference numerals and duplicate description will be omitted.

Figure 21:
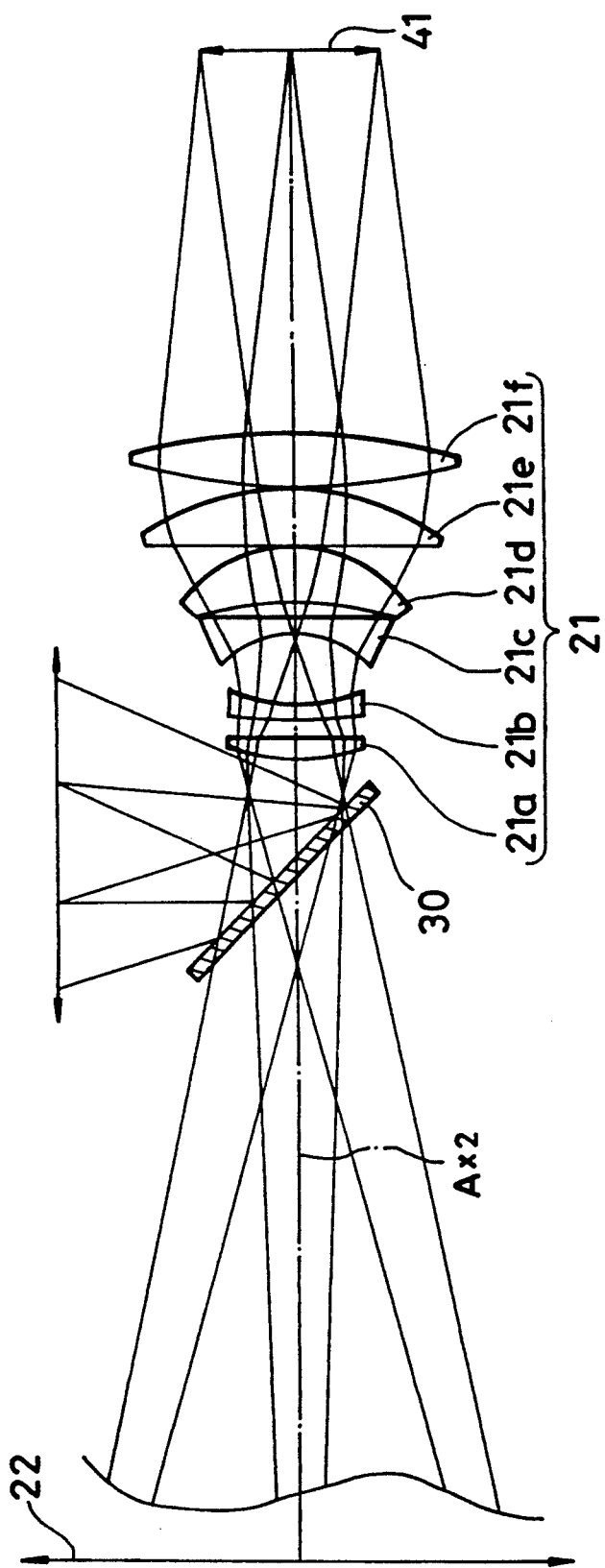
FIGS. 21 through 23 show a telecentric projecting device of the conventional reflecting illumination type projecting device.

This projecting lens 21 comprises six pieces of first to sixth lenses $21a \sim 21f$ the same as the prior art of FIG. 21. The projecting lens 21 according to this embodiment is a front diaphragm telocentric lens telocentric at the side of the object 41 and in which the diaphragm is situated at the side of the screen 22 than the lens.

The half-size mirror 50 is disposed at the side of the light source 11 with respect to the optical axis $AX_2$ in position acting as an aperture diaphragm of the projecting lens 21. The mirror 50 covers a half part of the optical path of the projecting optical system between the stage 40 and relay mirror 23.

On the other hand, the condenser lens 12 of the illuminating optical system 10 is disposed as such that the light source 11 is conjugate with the half-size mirror 50 and an image of the light source is formed on the half-size mirror 50.

When the illuminating light flux is made incident to the projecting lens 21 from one side with reference to the optical axis $AX_2$ by the half-size mirror 50, as the lens is telecentric toward the object 41, the illuminating light is guided to the object 41 at angles with respect to the optical axis $AX_2$ from the side where the mirror 50 is located. Therefore, the regularly reflecting component at the object 41 is made incident to the projecting lens 21 at angles with respect to the optical axis $AX_2$ at the side where the mirror is not located. At position of the exit pupil, the regularly reflecting component transmits toward the screen 22 through the side where the half-size mirror 50 is not located.

Moreover, this reflected light forms an image of the object at the side where the mirror 50 is located with respect to the optical axis $AX_2$ from the position of the exit pupil.

In order to receive the regularly reflecting component from the object, the screen 22 is located in position displaced toward the same side of the half-size mirror 50 with respect to the optical axis $AX_2$ of the projecting lens 21. Particularly, as the projecting lens 21 is telecentric in this example, the whole screen is located at the same side of the half-size mirror 50 than the optical axis $AX_2$.

As it is only one side on the stage 40 with respect to the optical axis $AX_2$, which is projected onto the screen 22, the object 41 is placed at the side opposite the mirror 50 with respect to the optical axis $AX_2$.

According to such constitution as just mentioned above, in the case that reflection is occurred by the mirror side surface of the fifth lens 21e, ghost is all guided to outside the screen as shown in FIG. 13. In this case, therefore, the ghost does not reach the screen and thus, it does not interfere the observation of the object.

Figure 22:
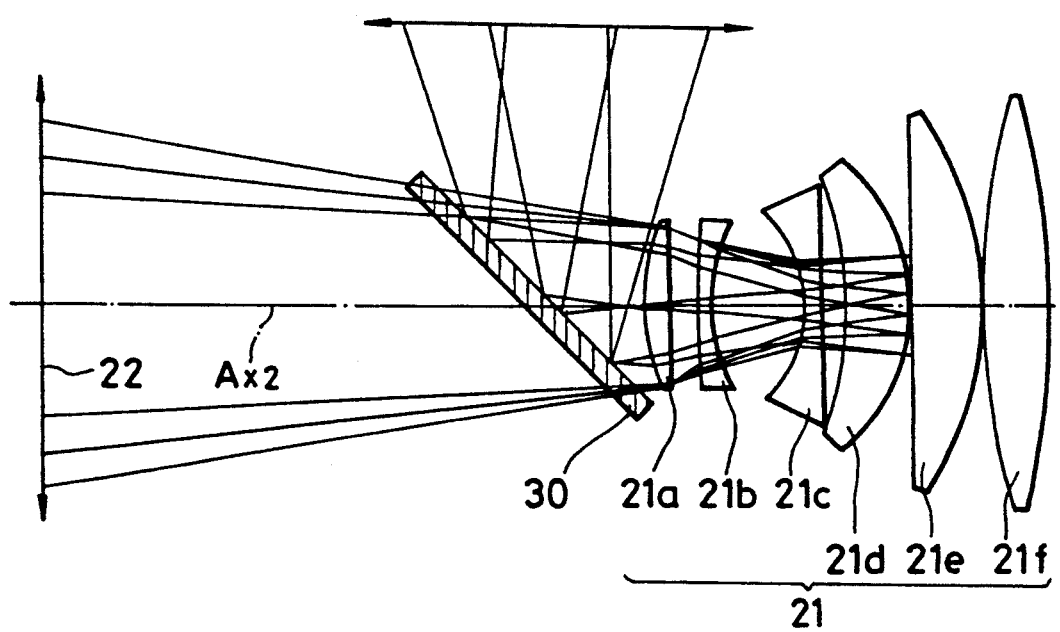
Figure 23:
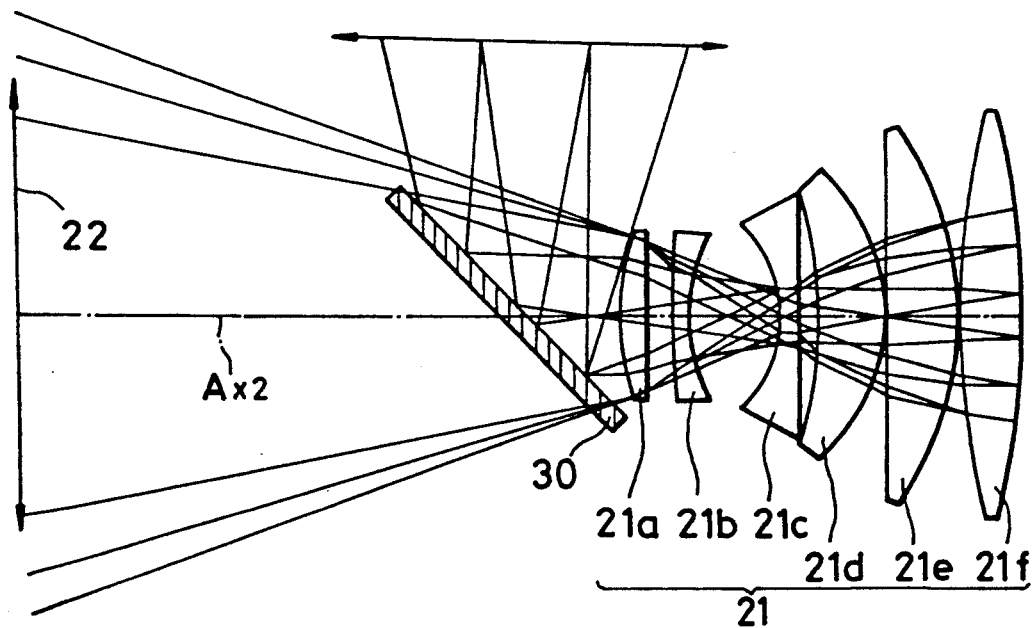

Furthermore, in the case that reflection is occurred by the object side surface of the sixth lens 21f, the ghost reaches one end portion of the screen 22 in the manner as shown in FIG. 14. In this case, however, as the divergence of the ghost is stronger than that of FIG. 13 and it is only one part of the ghost that reaches the screen, adverse affection to the observation is small compared with the prior art (FIGS. 22 and 23).

EXAMPLE 3

Figure 15:
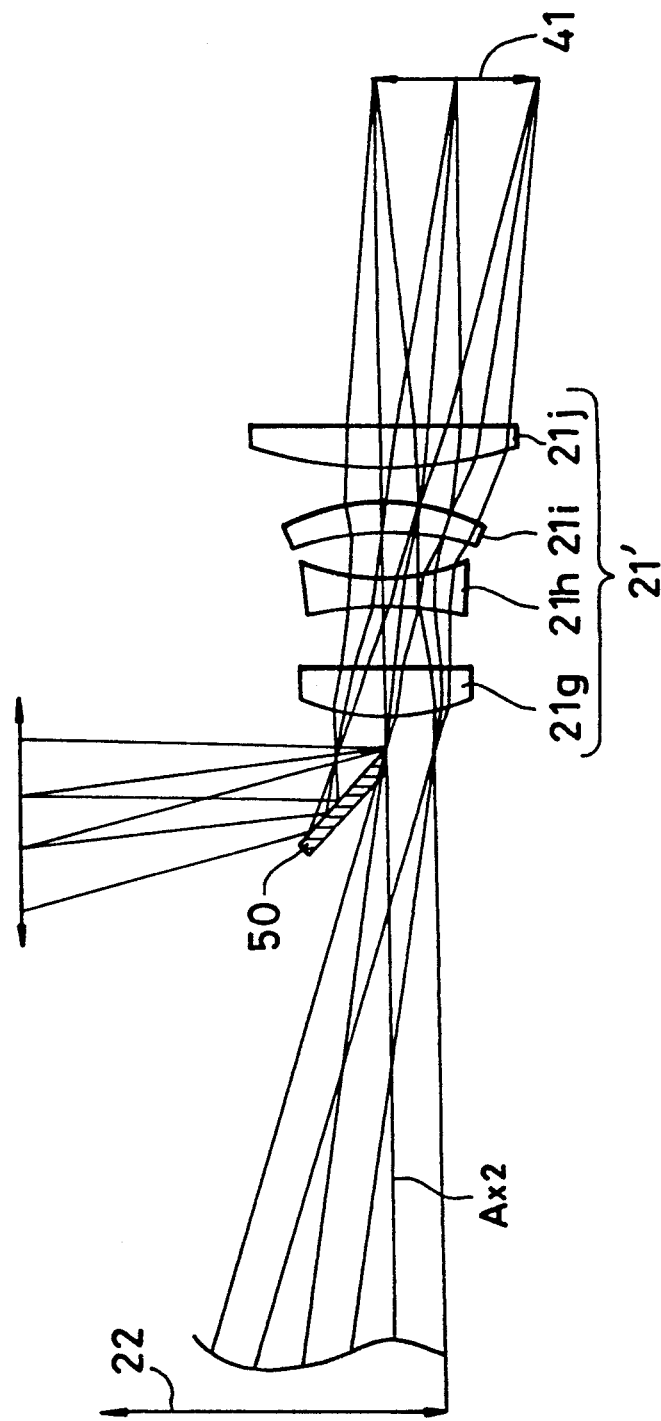
FIGS. 15 through 17 show a nontelecentric projecting lens according to a third embodiment of the present invention.
Figure 16:
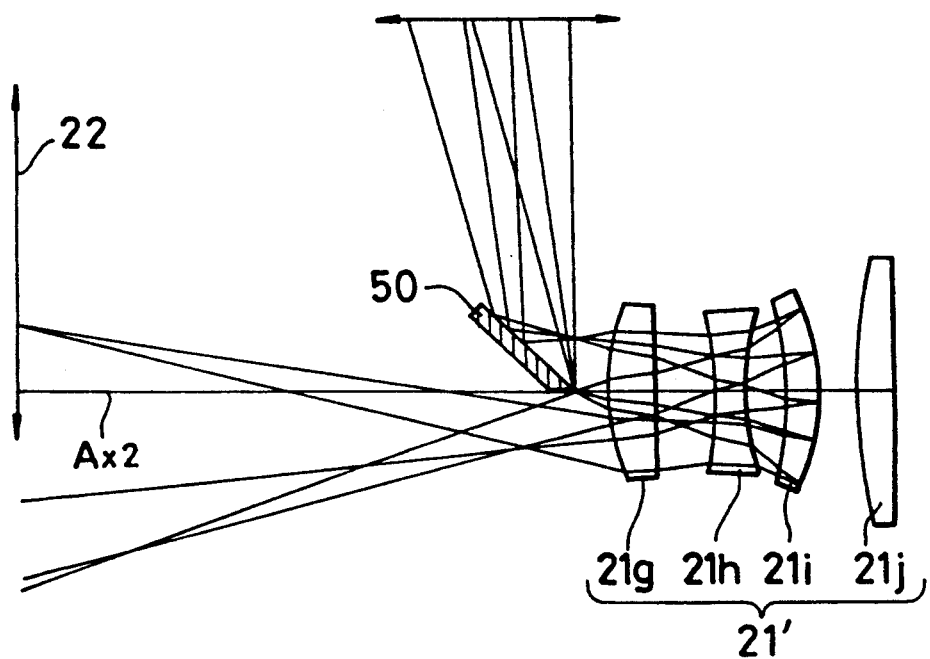
Figure 17:
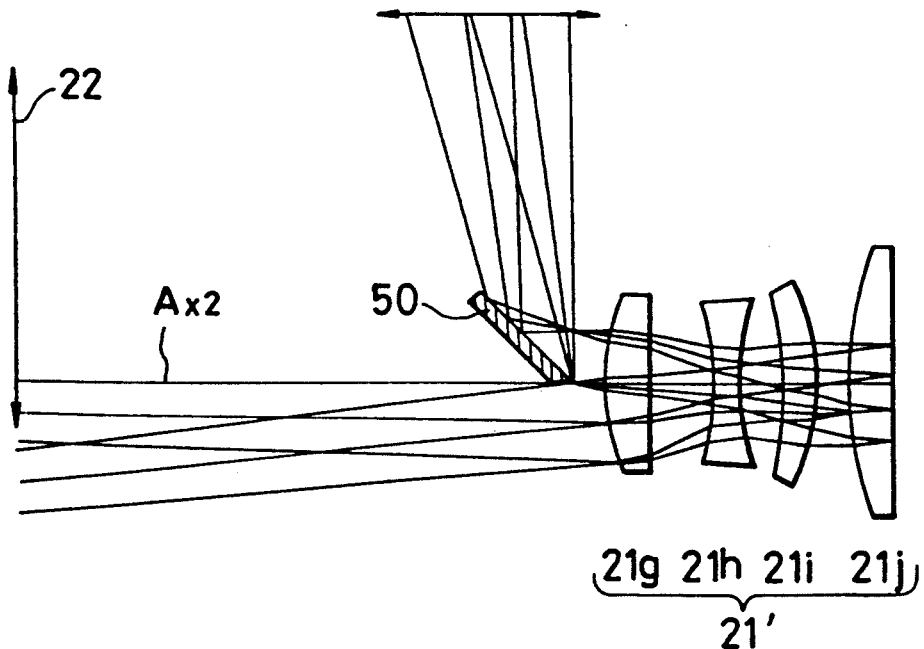

FIGS. 15 through 17 shows a third embodiment of the present invention. In the following description, component parts same to or identical with those of the first embodiment will be represented by the same reference numerals and duplicate description will be omitted.

Figure 24:
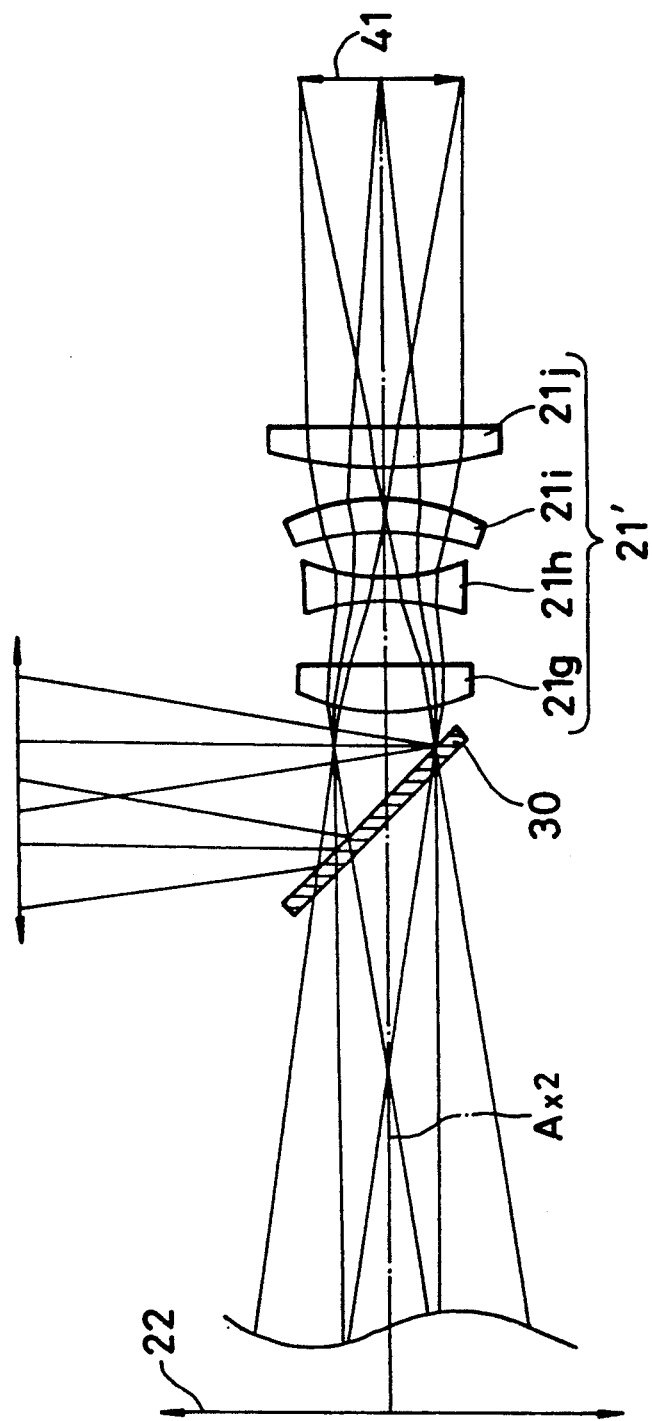
FIGS. 24 through 26 show a nontelecentric projecting lens of the conventional reflecting illumination type projecting device.

The projecting lens 21' shown in this example is the same as prior art of FIG. 24 and comprises first to fourth lenses 21g~21j. Also, the half-size mirror 50, as in the example of FIG. 2, is located at one side with respect to the optical axis $AX_2$ in position acting as the exit pupil of the projecting lens 21'.

The screen 22 is located in position displaced so that most part thereof is situated at the same side to the half-size mirror 50 with respect to the optical axis $AX_2$.

In the case of the above-mentioned constitution, the light flux emitted from the illuminating optical system, as in the case of FIG. 12, is all reflected toward the stage 40 and the reflected light from the object 41 transmits through the side where the half-size mirror 50 is not located toward the screen 22.

Figure 25:
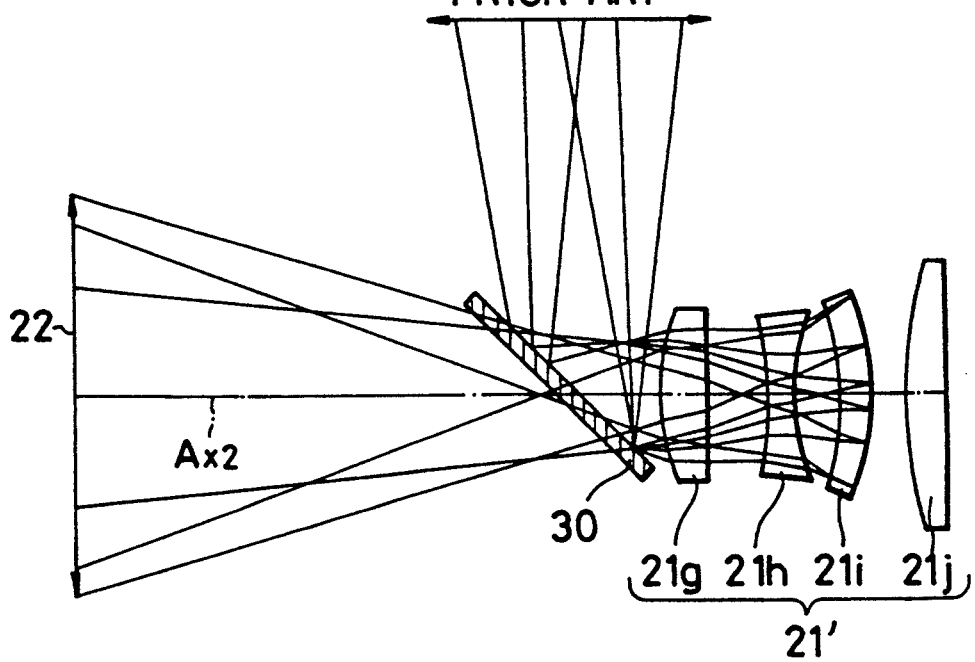
Figure 26:
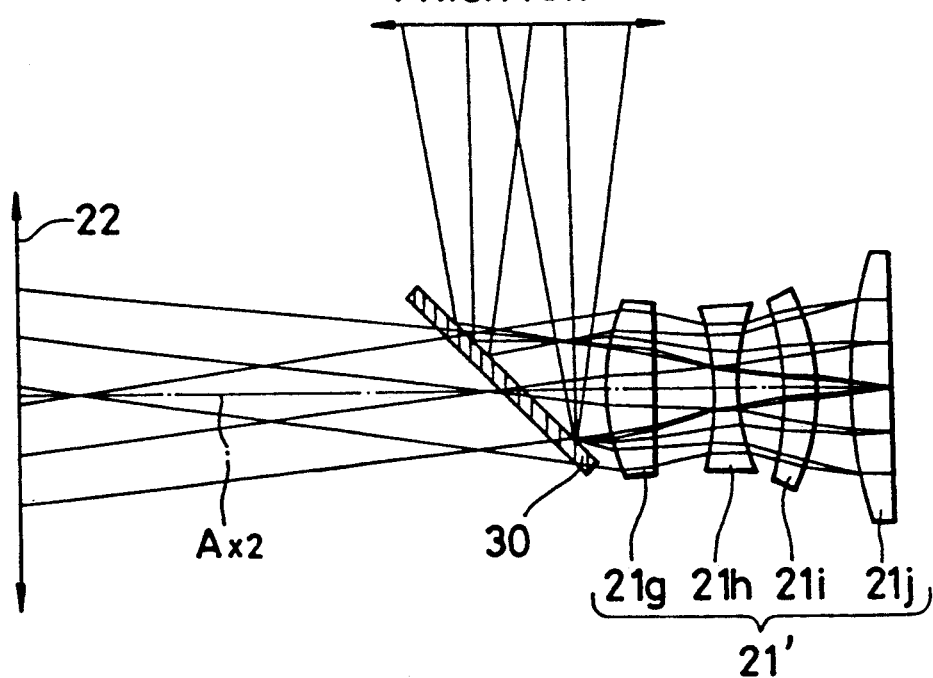

In the projecting lens 21' of FIG. 15, in the case that reflection is occurred by the object side surface of the third lens 21i, ghosts appears at one end portion of the peripheral portion of the screen 22 as shown in FIG. 16. Also, in the case that reflection is occurred at the object side surface of the fourth lens 21j, a smaller ghost than that of FIG. 16 appears at the peripheral portion of the screen 22 as shown in FIG. 17. According to the comparison with the prior art (FIGS. 25 and 26), however, adverse affection by the ghost is small and possibility for interfering the observation is small.

In the above-mentioned embodiment, the light flux coming from the light source is reflected by the half-size mirror 50 and guided to the object 41 through the projecting lens 21, and then, the reflected light from the object is directly projected onto the screen 22 as described above.

However, the scope of the application of the present invention is not limited to the above-mentioned constitution.

Figure 18:
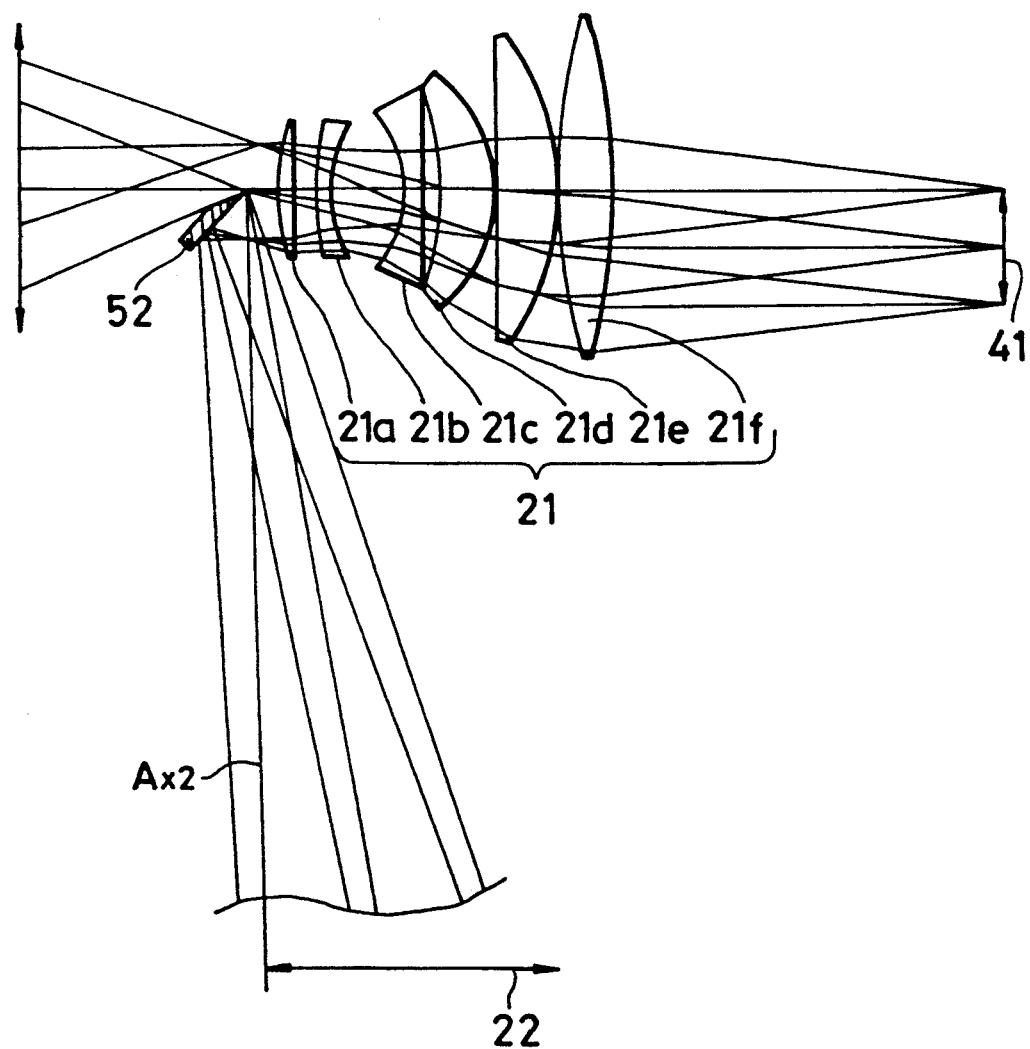
FIGS. 18 and 19 are explanatory views of a modified embodiment of the above-mentioned embodiment for showing a light flux coming from an object to be tested.
Figure 19:
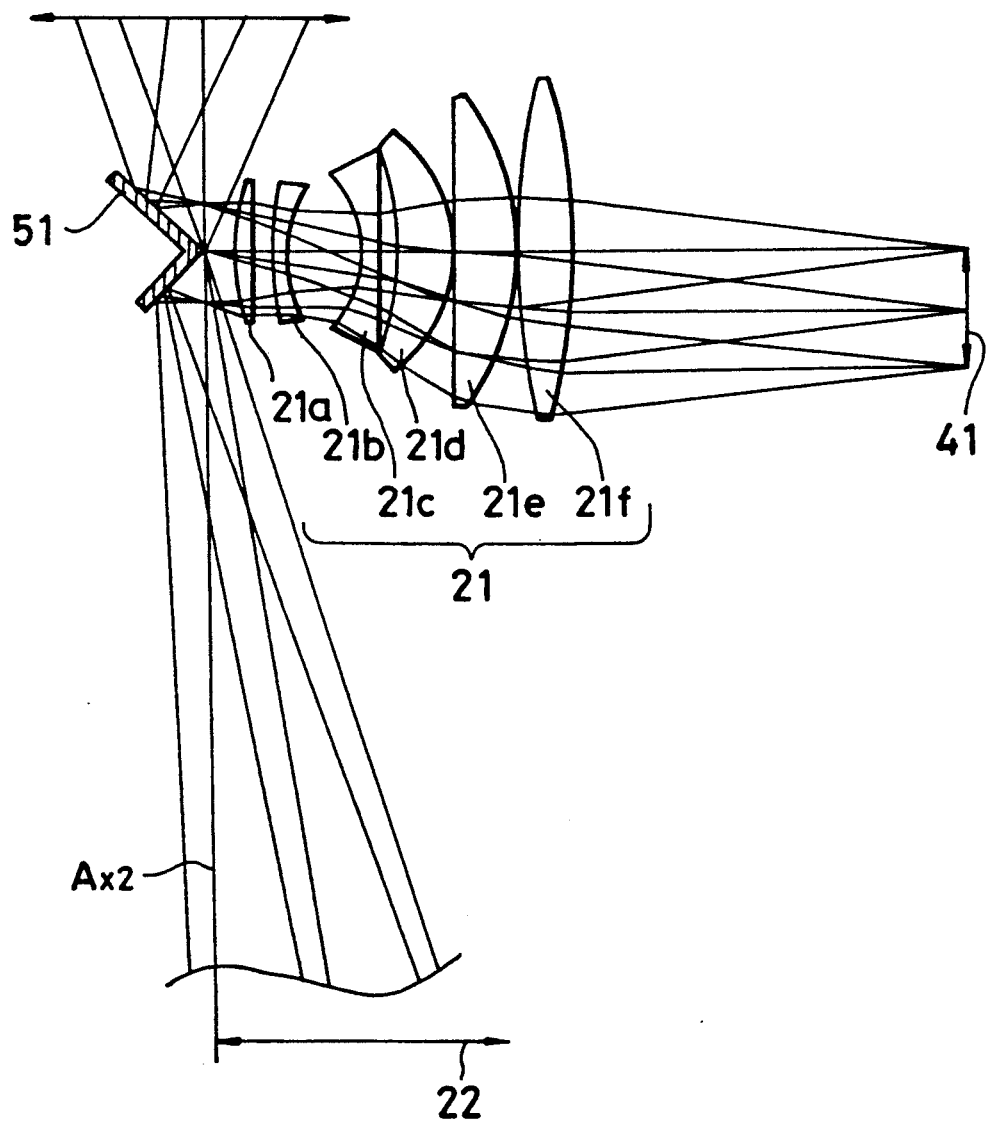
Figure 20:
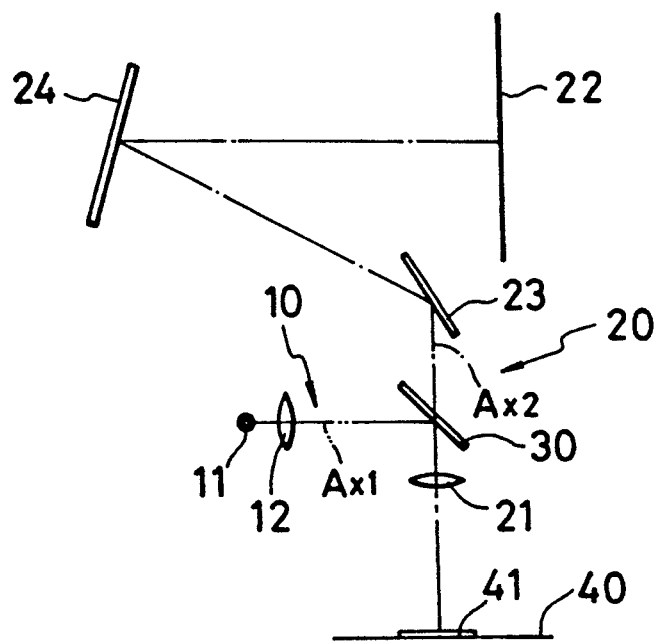
FIG. 20 is a schematic view of an optical system of the conventional reflecting illumination type projecting device.

The same is likewise effectively applicable to the device having such an arrangement as shown in FIGS. 18 and 19 which respectively correspond to FIGS. 7 and 8 of the first embodiment.

In the example of FIG. 18, contrary to the example of FIG. 12, the light flux coming from the light source is directly made incident to the projecting lens 21 and the reflected light from the object 41 is bent by using the half-size mirror 52 and then guided to the screen 22.

In the example of FIG. 19, a roof mirror 51 is employed instead of the half-size mirror 50, and the light flux made incident to the projecting lens 21 from the side of the light source and the optical path reflected by the object and advances toward the screen 22 are bent by means of reflection.

Any example of FIGS. 18 and 19 is the same to the example of FIG. 12 with respect to the positional relationship when developed along the optical path, only excepting arrangement relation of the optical elements such as mirrors, etc.

What is claimed is:

1. A reflecting illumination projecting device, comprising:
   a projecting lens having an optical axis intersecting an object to be tested;
   a light source portion for illuminating said object through said projecting lens;
   a surface onto which an image of said object is projected by light that is reflected from said object and which passes through said projecting lens; and
   an optical path separating element disposed in substantially at an exit pupil of said projecting lens, said optical path separating element being formed with a total reflecting mirror portion for reflecting substantially all illumination light or reflected light, said optical path separating element having a transmitting portion for transmitting a remaining light, thereby making said illuminating light incident to said projecting lens and guiding said reflected light towards said surface.

2. A reflecting illumination projecting device according to claim 1, wherein said light source portion comprises a light source for generating a light flux, and a condenser lens for condensing an illuminating light onto the optical axis of said projecting lens.

3. A reflecting illumination projecting device according to claim 2, wherein said light source comprises a xenon lamp.

4. A reflecting illumination projecting device according to claim 2, wherein said light source portion comprises a first lens having a focal length $f_1$, a field stop having an effective aperture $S_2$, and a second lens having a focal length $f_2$ which are arranged in this order from a side of said light source, a relation of $S_2 \approx (f_2/f_0) \cdot S_1$ being satisfied, wherein $S_1$ is an effective aperture of said object and $f_0$ is a focal length of said projecting lens.

5. A reflecting illumination projecting device according to claim 2, wherein said light source portion comprises a first lens having a focal length $f_1$, a field stop having an effective aperture $S_2$, and a second lens having a focal length $f_2$ which are arranged in this order from a side of said light source, a condition of $(f_2/f_1) \cdot \phi_G \leq \phi_H$ being satisfied, wherein $\phi_H$ comprises a diameter of an exit pupil of said projecting lens and $\phi_G$ comprises a dimension of said light source.

6. A reflecting illumination projecting device according to claim 1, wherein a condition of $\theta_2 \geq \theta_0$ is is satisfied, $\theta_2$ comprising an incident angle of a ray of light to said exit pupil of said projecting lens and $\theta_0$ comprising an incident angle of a ray of light to said projecting lens which is required to illuminate a whole area of said object.

7. A reflecting illumination projecting device according to claim 1, wherein a condition of $\theta_2 = \theta_0$ is satisfied, $\theta_2$ comprising an incident angle of a ray of light to said exit pupil of said projecting lens and $\theta_0$ comprises an incident angle of a ray of light to said projecting lens which is required to illuminate a whole area of said object.

8. A reflecting illumination projecting device according to claim 1, wherein a condition of $\phi_G' \leq \phi_H$ is satisfied, $\phi_H$ comprising a diameter of said exit pupil of said projecting lens and $\phi_G'$ comprising a dimension of a secondary image of said light source.

9. A reflecting illumination projecting device according to claim 1, wherein said projecting lens comprises a telecentric lens.

10. A reflecting illumination projecting device according claim 1, wherein said projecting lens is capable of having its focal length varied.

11. A reflecting illumination projecting device according to claim 10, wherein said projecting lens is provided with exchangeable lenses, each lenses having a different focal length.

12. A reflecting illumination projecting device according to claim 10, wherein said projecting lens comprises a zoom lens.

13. A reflecting illumination projecting device according to claim 1, wherein said optical path separating element is provided on one side with a total reflecting mirror portion and at the other side with a transmitting portion with respect to a diameter of said projecting lens.

14. A reflecting illumination projecting device according to claim 1, wherein said optical path separating element includes a central portion and a peripheral portion with respect to the optical axis of said projecting lens, either said central portion or said peripheral portion comprising a total reflecting mirror portion, the remaining one of either said central portion or said peripheral portion comprising a transmitting portion.

15. A reflecting illumination projecting device according to claim 1, wherein the optical axis of said light source portion and the optical path of said projecting lens are generally vertically intersected with each other, the optical path separating element being disposed such that said total reflecting mirror portion is situated only on one side with respect to a diameter of said projecting lens in order to reflect said illuminating light towards said projecting lens.

16. A reflecting illumination projecting device according to claim 1, wherein the optical axis at a side of said surface is generally vertically intersected with the optical axis of said projecting lens, said optical path separating element being disposed such that a total reflecting mirror portion is situated only on one side with respect to a diameter of said projecting lens in order to reflect said illuminating light toward said surface.

17. A reflecting illumination projecting device comprising
 a projecting lens having an optical axis intersecting an object to be tested;
 a light source portion for illuminating the object through said projecting lens;
 a half-size mirror disposed at one side with respect to the diameter of said projecting lens in the vicinity of an exit pupil of said projecting lens and adapted to reflect an illuminating light so that the illuminating light is made incident to said projecting lens; and
 a screen onto which an image of the object is projected by light reflected on the object through said projecting lens.

18. A reflecting illumination projecting device according to claim 17, wherein said light source portion includes a light source for generating a light flux, and a condenser lens for condensing an illuminating light onto the optical axis of said projecting lens.

19. A reflecting illumination projecting device according to claim 18, wherein said light source is a xenon lamp.

20. A reflecting illumination projecting device according to claim 17, wherein said projecting lens comprises a telecentric lens.

21. A reflecting illumination projecting device comprising
 a projecting lens having an optical axis intersecting an object to be tested;
 a light source portion for illuminating the object through said projecting lens;
 a surface onto which an image of the object is projected by light reflected on the object through said projecting lens; and
 a half-size mirror disposed at one side with respect to the diameter of said projecting lens in the vicinity of an exit pupil of said projecting lens and adapted to reflect an illuminating light toward said surface.

22. A reflecting illumination projecting device according to claim 21, wherein said light source portion includes a light source for generating a light flux, and a condenser lens for condensing the illuminating light toward the side where said half-size mirror is not located with respect to the diameter of said projecting lens.

23. A reflecting illumination projecting device according to claim 22, wherein said light source is a xenon lamp.

24. A reflecting illumination projecting device according to claim 21, wherein said projecting lens comprises a telecentric lens.

25. The reflecting illumination projecting device as in claim 1, said surface comprising a screen.

26. The reflecting illumination projecting device as in claim 17, said surface comprising a screen.

27. The reflecting illumination projecting device as in claim 21, said surface comprising a screen.

28. A reflecting illumination projecting device, comprising:
- a projecting lens having an optical axis that intersects an object to be tested;
- a light source portion for illuminating said object through said projecting lens;
- a surface onto which an image of said object is projected by light reflected on said object through said projecting lens; and
- an optical path separating element that is disposed at an exit pupil of said projecting lens and formed with a first total reflecting mirror portion for reflecting substantially all of an illuminating light, so that said illuminating light is made incident to said projecting lens, and a second total reflecting mirror portion for reflecting substantially all of a reflected light, so that said reflected light is guided to a side of said surface having a diameter of said projecting lens laid therebetween.

29. A reflecting illumination projecting device according to claim 28, wherein said light source portion includes a light source for generating a light flux, and a condenser lens for condensing an illuminating light onto the optical axis of said projecting lens.

30. A reflecting illumination projecting device according to claim 29, wherein said light source comprises a xenon lamp.

31. A reflecting illumination projecting device according to claim 28, wherein said projecting lens comprises a telecentric lens.

32. The reflecting illumination projecting device as in claim 28, said surface comprising a screen.

33. A reflecting illumination projecting device comprising
- a projecting lens having an optical axis intersecting an object to be tested;
- a light source portion for illuminating the object through said projecting lens;
- ring light flux forming means for making an illuminating light coming from said light source portion into a ring shape;
- a surface onto which an image of the object is projected by light reflected on the object through said projecting lens; and
- an optical path separating element disposed in the vicinity of an exit pupil of said projecting lens, said element being provided at a peripheral portion thereof with respect to the optical axis of said projecting lens with a total reflecting mirror portion for reflecting an illuminating light toward said projecting lens and at a central portion thereof with a transmitting portion for transmitting a reflected light toward said surface.

34. A reflecting illumination projecting device, comprising:
- a projecting lens having an optical axis that intersects an object to be tested:
- a xenon lamp for generating a light flux;
- a condenser lens for condensing an illuminating light onto the optical axis of said projecting lens;
- a surface onto which an image of said object is projected by light reflected from said object through said projecting lens; and
- an optical path separating element that is disposed substantially at an exit pupil, said optical path separating element being formed with a total reflecting mirror portion for reflecting substantially all illuminating light or reflected light, and a transmitting portion for transmitting substantially all remaining light, thereby making said illuminating light incident to said projecting lens and hiding said reflected light toward said surface.

35. A reflecting illumination projecting device according to claim 34, wherein said light source portion includes a light source for generating a light flux, and a condenser lens for condensing an illuminating light onto the optical axis of said projecting lens.

36. A reflecting illumination projecting device according to claim 35, wherein said light source comprises a xenon lamp.

37. A reflecting illumination projecting device according to claim 34, wherein said projecting lens comprises a telecentric lens.

38. The reflecting illumination projecting device as in claim 33, said surface comprising a screen.

39. The reflecting illumination projecting device as in claim 34, said surface comprising a screen.

40. A reflecting illumination projecting device, comprising:
- a projecting lens having an optical axis that intersects an object to be tested;
- a light source that produces an illuminating light that is incident from one side with respect to the optical path of said projecting lens;
- an optical path separating element that is disposed substantially at a pupil at an exit side of said projecting lens for projecting a ray of light of an image of said object, said optical path separating element being formed with a total reflecting mirror portion for reflecting substantially all illuminating light or reflected light, and a transmitting portion for transmitting substantially all remaining light, thereby making said illuminating light incident to said projecting lens and guiding said reflected light toward said surface; and
- a surface onto which an image of said object is projected through said projecting lens, said surface being disposed in a position displaced towards a side where a light flux coming from said light source portion is made incident to said projecting lens with respect to the optical axis.

41. A reflecting illumination projecting device according to claim 40, wherein said projecting lens comprises a telecentric lens, and and said surface is disposed at a side where said light flux coming from said light source portion is made incident to said projecting lens with reference to the optical axis of said projecting lens.

42. A reflecting illumination projecting device according to claim 40, wherein said light source portion includes a light source for generating a light flux, and a condenser lens for condensing illuminating light onto said total reflecting portion of said optical path separating element.

43. A reflecting illumination projecting device according to claim 40, wherein said light source comprises a xenon lamp.

44. The reflecting illumination projecting device as in claim 40, said surface comprising a screen.

45. A reflecting illumination projecting device comprising
- a projecting lens having an optical axis intersecting an object to be tested;
- a light source for illuminating the object through said projecting lens;

a half-size mirror disposed at one side with reference to the diameter of said projecting lens in the vicinity of the exit pupil of said projecting lens and adapted to reflect an illuminating light so that the illuminating light is made incident to said projecting lens; and a surface onto which an image of the object is projected through said projecting lens, said surface being disposed in position displaced to the side where a light flux coming from said light source portion is made incident to said projecting lens with reference to the optical axis of said projecting lens.

46. A reflecting illumination projecting device according to claim 45, wherein said projecting lens comprises a telecentric lens, and said surface is disposed at a side wherein said light flux from said light source portion is made incident to said projecting leans with reference to the optical axis of said projecting lens.

47. A reflecting illumination projecting device according to claim 45, wherein said light source portion includes a light source for generating a light flux, and a condenser lens for condensing a illuminating light onto said half-size mirror.

48. A reflecting illumination projecting device according to claim 47, wherein said light source is a xenon lamp.

49. The reflecting illumination projecting device as in claim 45, said surface comprising a screen.

50. A reflecting illumination projecting device comprising a projecting lens having a optical axis intersecting an object to be tested;

a light source portion for illuminating the object through said projecting lens;

a surface onto which an image of the object is projected through said projecting lens, said surface being disposed in position displaced toward the side where a light flux coming from said light source portion is made incident to said projection lens with reference to the optical axis of said projecting lens; and a half-size mirror disposed at one side with reference to the diameter of said projecting lens in the vicinity of an exit pupil of said projecting lens and adapted to reflect a reflected light from the object toward said surface.

51. A reflecting illumination projecting device according to claim 50, wherein said projecting lens comprises a telecentric lens, and said surface is disposed at a side wherein a light flux from said light source portion is made incident to said projecting lens with reference to the optical axis of said projecting lens.

52. A reflecting illumination projecting device according to claim 50, wherein said light source portion includes a light source for generating a light flux, and a condenser lens for condensing an illuminating light onto said half-size mirror.

53. A reflecting illumination projecting device according to claim 52, wherein said light source is a xenon lamp.

54. The reflecting illumination projecting device as in claim 50, said surface comprising a screen.

55. A reflecting illumination projecting device, comprising:

a projecting lens having an optical axis that intersects an object to be tested;

a light source for illuminating said object through said projecting lens;

surface onto which an image of said object is projected object through said projecting lens;

an optical path separating element that is disposed at an exit pupil of said projecting lens and which is formed with a first total reflecting mirror portion for reflecting substantially all illuminating light so that said illuminating light is made incident to said projecting lens and a second total reflecting mirror portion for reflecting substantially all reflected light so that said reflected light is guided to a side of said surface having a diameter of said projecting lens laid therebetween; and said surface being disposed in a position that is displaced towards a side where a light flux from said light source portion is made incident to said projecting lens with reference to the optical axis of said projecting lens.

56. A reflecting illumination projecting device according to claim 55, wherein said projecting lens comprises a telecentric lens, and said surface is disposed at a side where said light flux from said light source portion is made incident to said projecting lens with reference to the optical axis of said projecting lens.

57. A reflecting illumination projecting device according to claim 55, wherein said light source portion includes a light source for generating a light flux, and a condenser lens for condensing an illuminating light onto the optical axis of said projecting lens.

58. A reflecting illumination projecting device according to claim 57, wherein said light source comprises a xenon lamp.

59. The reflecting illumination projection device as in claim 55, said surface comprising a screen.

60. A reflecting illumination projecting device, comprising:

a projecting lens that has an optical axis that intersects an object to be tested;

a light source portion for illuminating said object through said projecting lens;

a surface onto which an image of said object is projected by light that is reflected from said object and which passes through said projecting lens; and an optical path separating element disposed in a vicinity of an exit pupil of said projecting lens, said optical path separating element being formed with a total reflecting mirror portion for reflecting either illumination light or reflected light, said optical path separating element having a transmitting portion that transmits remaining light, so as to make said illuminating light incident to said projecting lens and to guide said reflected light towards said surface, the optical axis of said light source portion and the optical path of said projecting lens being generally vertically intersected with each other, said optical path separating element being disposed such that said total reflecting mirror portion is situated on one side with respect to a diameter of said projecting lens in order to reflect said illuminating light towards said projecting lens.

61. The reflecting illumination projecting device as in claim 60, said surface comprising a screen.

62. A reflecting illumination projecting device, comprising:

a projecting lens that has an optical axis that intersects an object to be tested;

a light source portion for illuminating said object through said projecting lens;

a surface onto which an image of said object is projected by light that is reflected from said object and which passes through said projecting lens; and an optical path separating element that is disposed in a vicinity of an exit pupil of said projecting lens, said optical path separating element being formed with a total reflecting mirror portion for reflecting either illumination light or reflected light, said optical path separating element having a transmitting portion that transmits remaining light, so as to make said illuminating light incident to said projecting lens and to guide said reflected light towards said surface, the optical axis at a side of said surface being generally vertically intersected with the optical axis of said projecting lens, said optical path separating element being disposed such that said total reflecting mirror portion is situated on one side with respect to a diameter of said projecting lens in order to reflect said illuminating light towards said screen.

63. The reflecting illumination projecting device as in claim 62, said surface comprising a screen.

64. A reflecting illumination projecting device according to claim 1, wherein said total reflecting mirror portion comprises means for reflecting substantially all said illumination light or reflected light along a first path, and said transmitting portion comprises means for transmitting said remaining light along a second path that is separate from said first path.

65. A reflecting illumination projecting device according to claim 33, wherein said ring light flux forming means comprises a small-sized conical mirror including a mirror surface for reflecting an illuminating light, and a large-sized conical mirror including a mirror surface for reflecting the reflected light from said small-sized conical mirror into said ring shape.

66. A reflecting illumination projecting device according to claim 34, wherein said total reflecting mirror portion comprises means for reflecting substantially all said illumination light or reflected light along a first path, and said transmitting portion comprises means for transmitting said remaining light along a second path that is separate from said first path.

67. A reflecting illumination projecting device according to claim 40, wherein said total reflecting mirror portion comprises means for reflecting substantially all said illumination light or reflected light along a first path, and said transmitting portion comprises means for transmitting said remaining light along a second path that is separate from said first path.

68. A reflecting illumination projecting device according to claim 60, wherein said total reflecting mirror portion comprises means for reflecting substantially all said illumination light or reflected light along a first path, and said transmitting portion comprises means for transmitting said remaining light along a second path that is separate from said first path.

69. A reflecting illumination projecting device according to claim 62, wherein said total reflecting mirror portion comprises means for reflecting substantially all said illumination light or reflected light along a first path, and said transmitting portion comprises means for transmitting said remaining light along a second path that is separate from said first path.

70. A reflecting illumination projecting device comprising:

a projecting lens having an optical axis intersecting an object to be projected;

a light source portion for illuminating said object through said projecting lens;

a surface onto which an image of said object is projected by light that is reflected from said object and that passes through said projecting lens; and an optical path separating element disposed in the vicinity of an exit pupil of said projecting lens, said element being provided at a peripheral portion thereof with respect to the optical axis of said projecting lens with a transmitting portion for transmitting a reflected light towards said surface, and at a central portion thereof with a total reflecting mirror portion for reflecting an illuminating light toward said projecting lens.

71. A reflecting illumination projecting device according to claim 70, wherein said light source portion comprises a light source for generating a light flux, and a condenser lens for condensing an illuminating light onto the optical axis of said projecting lens.

72. The reflecting illumination projecting device as in claim 70, said surface comprising a screen.

73. A reflecting illumination projecting device, said device comprising:

a projecting lens including an exit pupil, said projecting lens defining an optical axis that intersects an object to be tested;

a light source for illuminating the object to be tested through said projecting lens;

a surface onto which an image of the object to be tested is projected, said projected image formed by light reflected from the object to be tested and which passes through said projecting lens; and, an optical path separating element disposed substantially at said exit pupil of said projecting lens, said optical path separating element formed with a total reflecting mirror portion for reflecting either illumination light or reflected light, said optical path separating element having a transmitting portion that transmits the remaining light, so as to make said illuminating light incident onto said projecting lens and to guide said reflected light towards said screen.

74. The reflecting illumination projecting device as in claim 73, said surface comprising a screen.

* * * * *

UNITED STATES PATENT AND TRADEMARK OFFICE
CERTIFICATE OF CORRECTION

PATENT NO. : 5,192,961
DATED : March 9, 1993
INVENTOR(S) : K. YOSHIDA et al.

It is certified that error appears in the above-indentified patent and that said Letters Patent is hereby corrected as shown below:

At column 13, line 5 (claim 4, line 7), change "≈" to --˙=. --

At column 16, line 5 (claim 34, line 18), change "hiding" to ---guiding---.

At column 18, line 3 (claim 55, line 7), before "surface" insert ---a---.

At column 18, line 4 (claim 55, line 8), delete "object".

Signed and Sealed this

Twelfth Day of September, 1995

Attest:

BRUCE LEHMAN

Attesting Officer    Commissioner of Patents and Trademarks